(12) United States Patent
Drakoulis

(10) Patent No.: US 10,909,469 B2
(45) Date of Patent: Feb. 2, 2021

(54) DATA DRIVEN INTELLIGENT LEARNING AND DEVELOPMENT APPARATUS AND METHOD

(71) Applicant: SurePeople LLC, Arlington Heights, IL (US)

(72) Inventor: Niko Drakoulis, Arlington Heights, IL (US)

(73) Assignee: SUREPEOPLE LLC, Arlington Heights, IL (US)

( * ) Notice: Subject to any disclaimer, the term of this patent is extended or adjusted under 35 U.S.C. 154(b) by 793 days.

(21) Appl. No.: 15/144,686

(22) Filed: May 2, 2016

(65) Prior Publication Data

US 2017/0316344 A1 Nov. 2, 2017

(51) Int. Cl.
*G06N 20/00* (2019.01)
*G09B 7/00* (2006.01)

(52) U.S. Cl.
CPC .............. *G06N 20/00* (2019.01); *G09B 7/00* (2013.01)

(58) Field of Classification Search
CPC ......... G09B 7/00; G06N 20/00; G06N 99/005
USPC .......................................................... 706/12
See application file for complete search history.

(56) References Cited

U.S. PATENT DOCUMENTS

| 7,502,748 | B1 | 3/2009 | Baldwin et al. |
| 7,558,767 | B2 | 7/2009 | Scarborough et al. |
| 7,606,778 | B2 | 10/2009 | Dewar |
| 7,831,460 | B1 | 11/2010 | Jones-Morton et al. |
| 8,073,731 | B1 | 12/2011 | Rajasenan |
| 8,386,481 | B1 | 2/2013 | Croner |
| 2002/0045154 | A1 | 4/2002 | Wood et al. |
| 2004/0153355 | A1 | 8/2004 | Deering et al. |
| 2004/0202988 | A1* | 10/2004 | Evans .................. G09B 7/02 434/236 |
| 2004/0210661 | A1 | 10/2004 | Thompson |
| 2004/0219493 | A1* | 11/2004 | Phillips ............... G09B 5/06 434/118 |
| 2005/0096973 | A1 | 5/2005 | Heyse et al. |
| 2006/0059159 | A1 | 3/2006 | Truong et al. |
| 2007/0048706 | A1 | 3/2007 | Tan |
| 2008/0176197 | A1 | 7/2008 | Hartog |
| 2009/0047643 | A1 | 2/2009 | Isaac et al. |
| 2009/0210281 | A1 | 8/2009 | Baldwin et al. |
| 2009/0319344 | A1 | 12/2009 | Tepper et al. |

(Continued)

FOREIGN PATENT DOCUMENTS

| JP | 2002-358393 A | 12/2002 |
| JP | 2002358393 A | 12/2002 |

(Continued)

OTHER PUBLICATIONS

Ryosuke I., "Human Resource Matching Method and System", JP2005018274. (Year: 2005).*

(Continued)

*Primary Examiner* — Dave Misir
(74) *Attorney, Agent, or Firm* — Klintworth & Rozenblat IP LLP; Timothy K. Klintworth

(57) ABSTRACT

A data driven intelligent learning and development apparatus and method using an assessment of various traits of an individual to develop skill practice areas, each with one or more development strategies to enhance and/or maintain selected skills of an individual related to the practice areas.

30 Claims, 56 Drawing Sheets

(56) References Cited

U.S. PATENT DOCUMENTS

| | | |
|---|---|---|
| 2010/0100496 A1 | 4/2010 | Baldwin et al. |
| 2011/0055098 A1 | 3/2011 | Stewart |
| 2012/0040326 A1* | 2/2012 | Larson-Rutter ......... G09B 5/00 434/350 |
| 2012/0331137 A1 | 12/2012 | Olsen et al. |
| 2013/0290207 A1 | 10/2013 | Bonmassar |
| 2013/0344464 A1 | 12/2013 | Mychals |
| 2014/0351156 A1 | 11/2014 | Orban |
| 2015/0079578 A1 | 3/2015 | Nardi |
| 2015/0095318 A1 | 4/2015 | Burrus et al. |
| 2015/0242979 A1* | 8/2015 | Abts .................. G09B 5/00 705/328 |
| 2015/0356512 A1 | 12/2015 | Bradley |
| 2015/0379453 A1 | 12/2015 | Myers |
| 2015/0379888 A1 | 12/2015 | Hill |
| 2016/0042282 A1 | 2/2016 | Amini |
| 2016/0292615 A1 | 10/2016 | Drakoulis |
| 2017/0116870 A1 | 4/2017 | Brem et al. |
| 2017/0316344 A1 | 11/2017 | Drakoulis |

FOREIGN PATENT DOCUMENTS

| | | |
|---|---|---|
| JP | 2003-242339 A | 8/2003 |
| JP | 2003242339 A | 8/2003 |
| JP | 2005-018274 A | 1/2005 |
| JP | 2005018274 A | 1/2005 |
| JP | 2005-044150 A | 2/2005 |
| JP | 2005044150 A | 2/2005 |

OTHER PUBLICATIONS

Yoichi O., "System, Method, and Program for Recruiting Employees", JP2002358393. (Year: 2002).*

Yukihisa O. et al., "Method for Advising Organizing", JP2003242339. (Year: 2003).*

Makoto I. et al., "Data Collecting Device", JP2005044150. (Year: 2005).*

International Search Report in corresponding Application No. PCT/US2016/025892 dated May 31, 2016.

"Workstyles Analysis", author unknown, published on or before Dec. 31, 2012, accessed and printed from URL <http://findyourlifestyle.com/wp-content/themes/livstyle/library/images/workstyle_example.pdf>, 13 pgs.

(Author unknown) Workstyles™ Analysis, Copyright 1997, Revised 2004, 2005, 2006 hwss, 15 pages.

Related U.S. Appl. No. 15/090,269, filed Apr. 4, 2016.
Related U.S. Appl. No. 15/090,342, filed Apr. 4, 2016.
Related U.S. Appl. No. 15/090,214, filed Apr. 4, 2016.

* cited by examiner

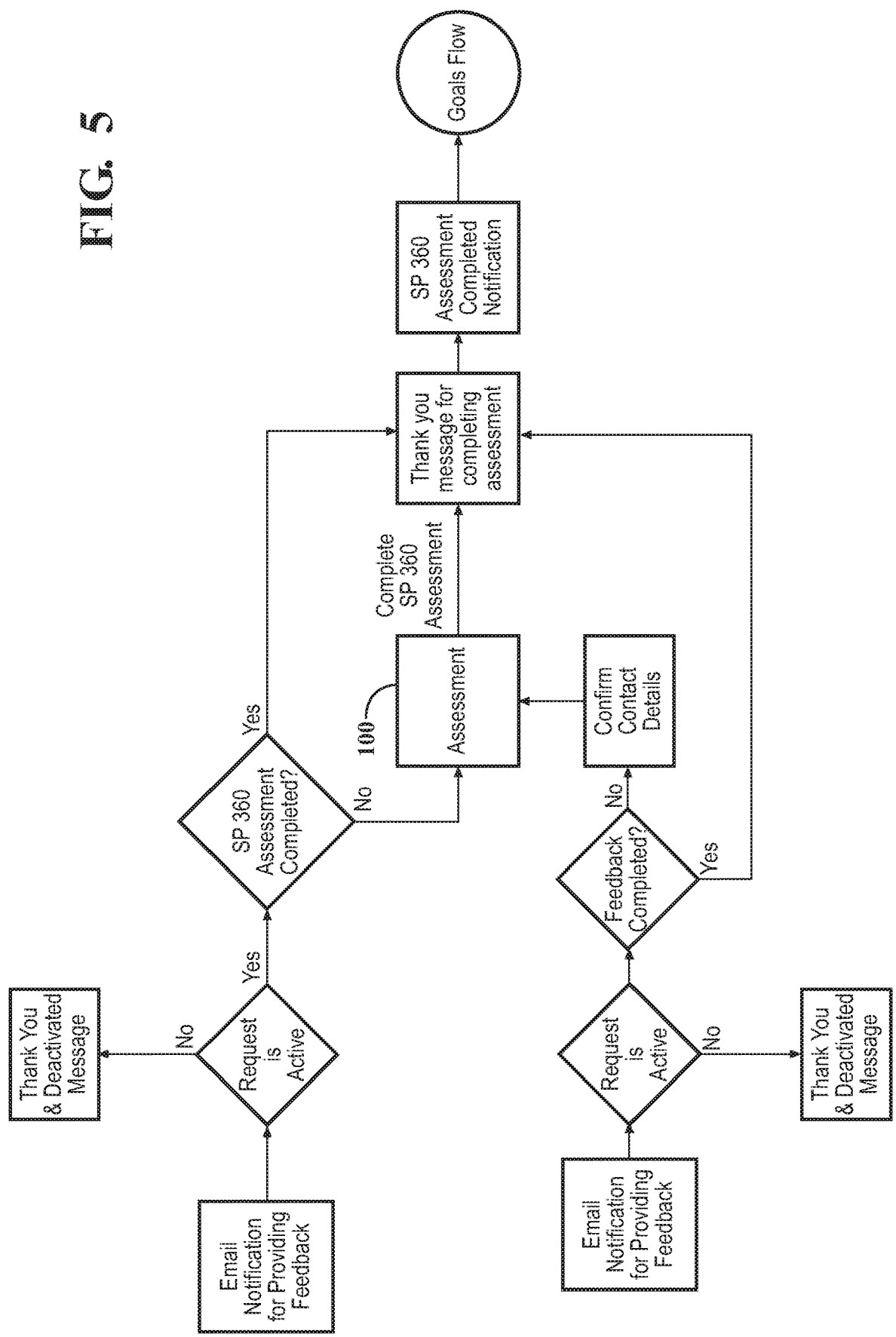

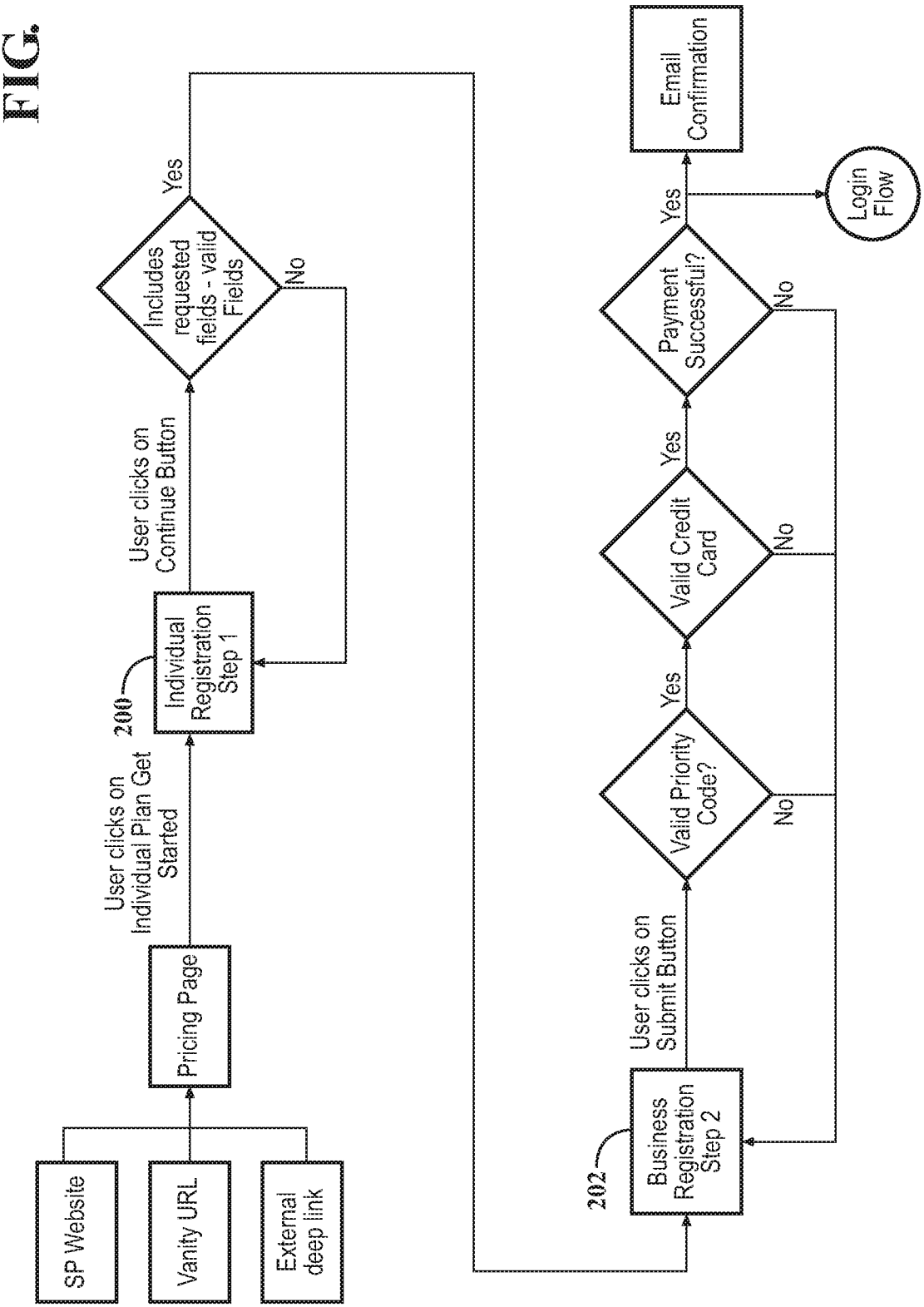

FIG. 11A

94% COMPLETE ─310

CHOOSE THE OPTION THAT MORE ACCURATELY DESCRIBES YOU.
Which one of these is more important to you...─300

☐ Quality    ☐ Convenience

<PREVIOUS  ─302        ─304    NEXT>
    ─306                    308─

FIG. 11B

0% COMPLETE

CHOOSE THE OPTION THAT MORE ACCURATELY DESCRIBES YOU.
You are more likely to be seen as someone who is...

☐ Easy to approach    ☐ Somewhat reserved

NEXT>

FIG. 11C

35% COMPLETE

CHOOSE THE OPTION THAT MORE ACCURATELY DESCRIBES YOU.

☐ I try to see that the other person's needs are met as well as mine    ☐ I recommend a middle ground solution

<PREVIOUS    NEXT>

FIG. 11D

53% COMPLETE

CHOOSE THE OPTION THAT MORE ACCURATELY DESCRIBES YOU.

When learning something new, I prefer...

- ☐ Learning with another person or group
- ☐ Learning by myself

<PREVIOUS          NEXT>

FIG. 11E

61% COMPLETE

CHOOSE THE OPTION THAT MORE ACCURATELY DESCRIBES YOU.

I enjoy a significant challenge more than being recognized for my work.

- ☐ Very much like me
- ☐ Somewhat like me
- ☐ Somewhat unlike me
- ☐ Very much unlike me

<PREVIOUS          NEXT>

FIG. 11F

68% COMPLETE

RANK THESE FOUR CONCEPTS IN ORDER OF MOST TO LEAST IMPORTANT. SELECT EACH OPTION AND DRAG IT TO THE APPROPRIATE CATEGORY. THEN, CLICK NEXT TO CONTINUE.

Your highest priority when dealing with a boss is:

| MOST | An open exchange of ideas |
| --- | --- |
| 2ND | Being enabled to see things through to the end |
| 3RD | Recognition from authority |
| LEAST | To have a predictable routine |

<PREVIOUS                                                                                          NEXT>

FIG. 11G

72% COMPLETE

RANK THESE FOUR CONCEPTS IN ORDER OF MOST TO LEAST IMPORTANT. SELECT EACH OPTION AND DRAG IT TO THE APPROPRIATE CATEGORY. THEN, CLICK NEXT TO CONTINUE.

| MOST | The opportunity to advance |
| --- | --- |
| 2ND | A good boss |
| 3RD | An interesting job |
| LEAST | Recognition & appreciation |

<PREVIOUS                                                                                          NEXT>

FIG. 11H

75% COMPLETE

SELECT THE WORD THAT MOST DESCRIBES YOU AND DRAG IT TO THE "MOST" CATEGORY. SELECT THE WORD THAT LEAST DESCRIBES YOU AND DRAG IT TO THE "LEAST" CATEGORY. THEN, CLICK NEXT TO CONTINUE.

| MOST | Kind |
| | Stimulating |
| | Independent |
| LEAST | Perceptive |

<PREVIOUS                                                                 NEXT>

FIG. 11I

89% COMPLETE

RANK THESE THREE CONCEPTS IN ORDER OF IMPORTANCE TO YOU. SELECT EACH OPTION AND DRAG IT TO THE APPROPRIATE CATEGORY. THEN, CLICK NEXT TO CONTINUE.

| MOST | Deciding my future direction |
| 2ND | Making a significant impact |
| LEAST | Job security and adequate retirement |

<PREVIOUS                                                                 NEXT>

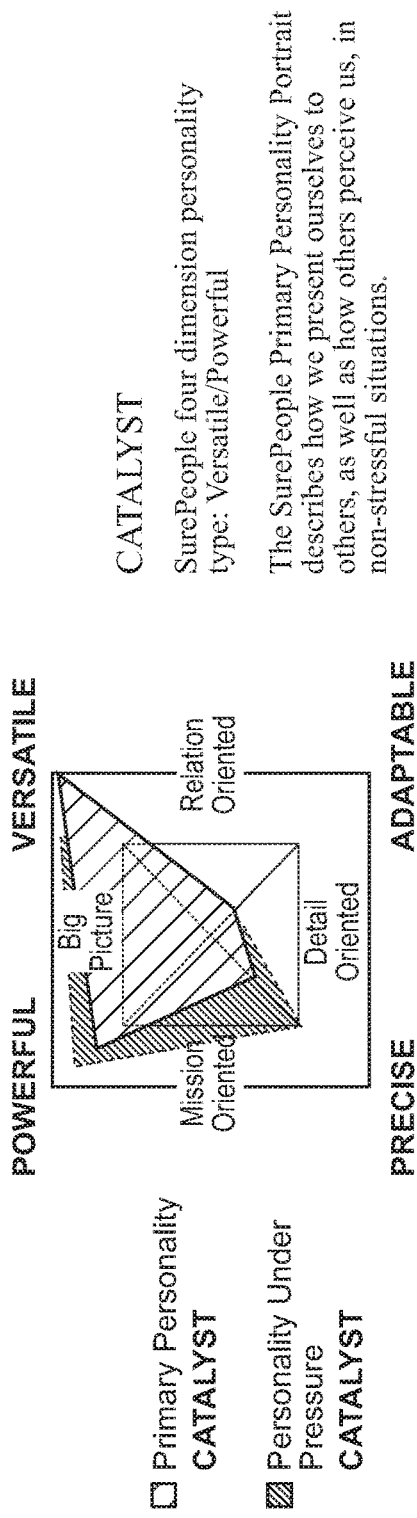

☐ Primary Personality
CATALYST

▨ Personality Under Pressure
CATALYST

CATALYST

SurePeople four dimension personality type: Versatile/Powerful

The SurePeople Primary Personality Portrait describes how we present ourselves to others, as well as how others perceive us, in non-stressful situations.

SUMMARY

Individuals with a CATALYST personality portrait possesses a natural ability to work with others. As a CATALYST, Michael can talk about anything with anyone, and use his persuasive verbal skills to inspire others to his cause. With an effervescent personality and a good sense of humor, he is often suitable for situations that require an ability to sell products, concepts or ideas.

By conducting business in a friendly manner, Michael can transform customers and clients into friends. However, he can be overly optimistic and overestimate his ability to bring people together to achieve the desired goal. Since maintaining a positive image is important, he may seek people-related assignments that provide the opportunity to shine.

Michael is often inspiring, even if not in a formal leadership role. However, when acting as a leader, he may inspire or persuade others to help with repetitive work processes or manage the details. Some people may have conflicted feelings working with him. On one hand, people can be strongly attracted to his social skills and confidence; on the other hand, they may also be distanced by the power of his personality. Some may feel exhausted by Michael's stamina to accomplish his goals.

Michael is naturally enthusiastic, causing him to charge ahead on a project without considering the important details. Routine and regimentation can diminish his enthusiasm. It could be a mistake to overwhelm him with details, as he is drawn to the "big picture."

FIG. 12A

INTERNAL TRAITS

WORK ENVIRONMENT CONTRIBUTION

Uses strong communication skills and personal enthusiasm to convince or motivate people toward a goal. A confident, natural promoter and seller, can close a deal, delegate responsibility and inspire others.

EMOTIONAL POSTURE

May be naturally enthusiastic and trusting.

DRIVING IDEAL

May prefer a position that offers status, influence, authority or prestige.

ASSESSES OTHERS BY

Their ability to verbalize and their flexibility and adaptability.

MOTIVATIONAL STYLE

Uses a friendly manner, openness and verbal adeptness. Can talk with anyone about anything.

MOST FAVORABLE WORK ENVIRONMENT

People-oriented, enjoys variety, recognition and prestige, without a lot of detail-oriented work

RELATIONAL/TASK ORIENTATION

Strikes a good balance between committing to people and tasks, which makes him a potentially effective leader.

MOBILITY PREFERENCE

Seeks an outlet for energy through variety, change and the quick attainment of goals.

OVER-USES

Enthusiasm, overselling and optimism.

WHEN PRESSURED

May be too easily persuaded. May be more organized under pressure when there is a desire to make a good impression.

UNEASY WHEN

There is a fixed environment that does not allow for variety. May experience a fear of losing the respect of work associates when relationships become strained due to conflict.

LEADERSHIP

First defines the goals, then offers enthusiasm in order to motivate others to perform. However, should be aware that others can feel used or manipulated because of this strong personality.

SUMMARY OF STRENGTHS

Verbal, persuasive, enthusiastic, independent, confident and versatile.

FIG. 12B

EXTERNAL ASPECTS

JOB MATCH

The CATALYST is a "take charge" kind of leader, so Michael may function most effectively when given independence, challenges, obstacles and problems with a minimum of details. He may function best when given the opportunity to direct, meet or entertain people. He needs a variety of opportunities to express new or creative ideas without a lot of detail-oriented work. In the job description, he prefers the opportunity to: be active, humorous and in charge; communicate, decide, develop, direct and entertain; gain recognition, influence, initiate solutions and lead others; manage, network, perform and relate; solve problems, supervise and verbalize.

COMMUNICATING WITH MICHAEL

Provide the "big picture" before providing any explanations, details and concerns. Since CATALYSTS are not good listeners by nature, compose thoughts into a short memo for Michael, detailing the problems, options and recommended actions. He will likely be open to personal testimony and endorsement, so persuade him with information about who is involved and who thinks it is a good idea. Also show how the project will be fun and interesting. Remind him of the details often or they may be forgotten.

DISAGREEING WITH MICHAEL

First, find the larger goal that can be agreed upon, then propose the plan that will expedite the plan. He can be highly committed to reaching a goal, with the particular methodology a lesser priority. Postponing an immediate decision may cause him to lose his emotional attachment to the idea. Delays of even a day or two may open the door for him to accept other ideas.

NEGATIVE PERCEPTIONS MICHAEL MAY HAVE OF OTHERS

He is prone to see others with a similar personality as territorial. Conflict may ensue over control. He can be turned off by too much talk and not enough results, and may see others as less motivated or holding up the process with trivial and excessive attention to details. He may be jealous of someone else receiving more attention and may see others as being too sensitive, pessimistic or slow in their work.

NEGATIVE PERCEPTIONS OTHERS MAY HAVE OF MICHAEL

Others may view him as disinterested or "on a mission." Those with soft personalities may view him as insensitive, self-centered and bullish. Detail-oriented people may perceive him as having a "know-it-all" attitude. Others might also find him to be disorganized, inaccurate or one who exaggerates facts.

FIG. 12C

EXTERNAL ASPECTS

NOTABLE CHARACTERISTICS

Others may view Michael as being positive, persuasive and the "life of the party." Talking may be more important than listening. There is a tendency to be friendly as well as argumentative and persistent in the desire to achieve personal objectives. He is not afraid of new activities, challenges or people. He may thrive on taking calculated risks and has a deep desire for acceptance among peers.

FUNDAMENTAL DESIRES/DRIVE

Michael may exhibit an outgoing and uninhibited social style. There is a strong desire to control events, manage people, be persuasive and be well liked by others. He may prefer to first deal with the "big picture" before exploring the details and avoids specific components and routine that can get tiresome.

RECOMMENDED IMPROVEMENTS

While friendly, Michael may occasionally be viewed as inconsiderate. Suggest focusing on "listening to understand" rather than "talking to convince." He is likely to have a streak of independence and is reluctant to change his less desirable habits. Although he can see the "big picture", he may not fully understand the level of detailed work required. Seeking feedback from more detailed-oriented work associates and friends would help him understand the process involved and achieve results.

HOW TO SUPERVISE AND ENCOURAGE

Michael wants independence but needs to know there are limits to his personal authority. He needs to know why certain things are expected, as he works best with clear directions. This will allow for the highest level of performance. He may not respond well to close supervision, so avoid micromanaging. Michael needs a manager who is willing to discuss matters openly in a democratic lighthearted manner.

FIG. 12D

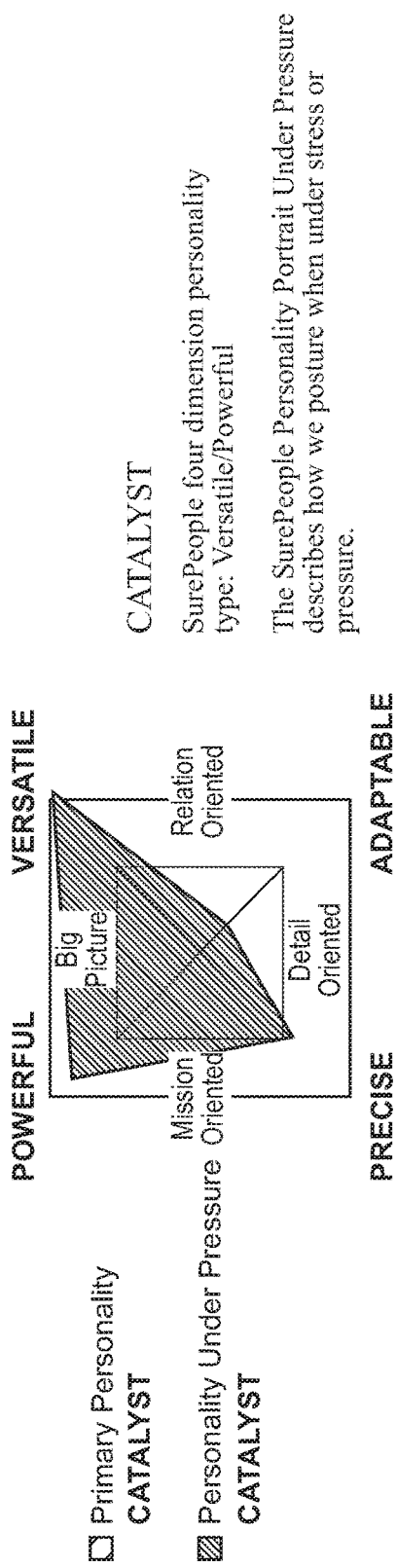

☐ Primary Personality
CATALYST

▨ Personality Under Pressure
CATALYST

CATALYST

SurePeople four dimension personality type: Versatile/Powerful

The SurePeople Personality Portrait Under Pressure describes how we posture when under stress or pressure.

Michael is often inspiring, even if not in a formal leadership role. However, when acting as a leader, he may inspire or persuade others to help with repetitive work processes or manage the details. Some people may have conflicted feelings working with him. On one hand, people can be strongly attracted to his social skills and confidence; on the other hand, they may also be distanced by the power of his personality. Some may feel exhausted by Michael's stamina to accomplish his goals.

Michael is naturally enthusiastic, causing him to charge ahead on a project without considering the important details. Routine and regimentation can diminish his enthusiasm. It could be a mistake to overwhelm him with details, as he is drawn to the "big picture."

SUMMARY

Individuals with a CATALYST personality portrait possesses a natural ability to work with others. As a CATALYST, Michael can talk about anything with anyone, and use his persuasive verbal skills to inspire others to his cause. With an effervescent personality and a good sense of humor, he is often suitable for situations that require an ability to sell products, concepts or ideas.

By conducting business in a friendly manner, Michael can transform customers and clients into friends. However, he can be overly optimistic and overestimate his ability to bring people together to achieve the desired goal. Since maintaining a positive image is important, he may seek people-related assignments that provide the opportunity to shine.

FIG. 13A

INTERNAL TRAITS

WORK ENVIRONMENT CONTRIBUTION

Uses strong communication skills and personal enthusiasm to convince or motivate people toward a goal. A confident, natural promoter and seller, can close a deal, delegate responsibility and inspire others.

EMOTIONAL POSTURE

May be naturally enthusiastic and trusting.

DRIVING IDEAL

May prefer a position that offers status, influence, authority or prestige.

ASSESSES OTHERS BY

Their ability to verbalize and their flexibility and adaptability.

MOTIVATIONAL STYLE

Uses a friendly manner, openness and verbal adeptness. Can talk with anyone about anything.

MOST FAVORABLE WORK ENVIRONMENT

People-oriented, enjoys variety, recognition and prestige, without a lot of detail-oriented work.

RELATIONAL/TASK ORIENTATION

Strikes a good balance between committing to people and tasks, which makes him a potentially effective leader.

MOBILITY PREFERENCE

Seeks an outlet for energy through variety, change and the quick attainment of goals.

OVER-USES

Enthusiasm, overselling and optimism.

WHEN PRESSURED

May be too easily persuaded. May be more organized under pressure when there is a desire to make a good impression.

UNEASY WHEN

There is a fixed environment that does not allow for variety. May experience a fear of losing the respect of work associates when relationships become strained due to conflict.

LEADERSHIP

First defines the goals, then offers enthusiasm in order to motivate others to perform. However, should be aware that others can feel used or manipulated because of this strong personality.

SUMMARY OF STRENGTHS

Verbal, persuasive, enthusiastic, independent, confident and versatile.

FIG. 13B

EXTERNAL ASPECTS

JOB MATCH

The CATALYST is a "take charge" kind of leader, so Michael may function most effectively when given independence, challenges, obstacles and problems with a minimum of details. He may function best when given the opportunity to direct, meet or entertain people. He needs a variety of opportunities to express new or creative ideas without a lot of detail-oriented work. In the job description, he prefers the opportunity to: be active, humorous and in charge; communicate, decide, develop, direct and entertain; gain recognition, influence, initiate solutions and lead others; manage, network, perform and relate; solve problems, supervise and verbalize.

COMMUNICATING WITH MICHAEL

Provide the "big picture" before providing any explanations, details and concerns. Since CATALYSTS are not good listeners by nature, compose thoughts into a short memo for Michael, detailing the problems, options and recommended actions. He will likely be open to personal testimony and endorsement, so persuade him with information about who is involved and who thinks it is a good idea. Also show how the project will be fun and interesting. Remind him of the details often or they may be forgotten.

DISAGREEING WITH MICHAEL

First, find the larger goal that can be agreed upon, then propose the plan that will expedite the plan. He can be highly committed to reaching a goal, with the particular methodology a lesser priority. Postponing an immediate decision may cause him to lose his emotional attachment to the idea. Delays of even a day or two may open the door for him to accept other ideas.

NEGATIVE PERCEPTIONS MICHAEL MAY HAVE OF OTHERS

He is prone to see others with a similar personality as territorial. Conflict may ensue over control. He can be turned off by too much talk and not enough results, and may see others as less motivated or holding up the process with trivial and excessive attention to details. He may be jealous of someone else receiving more attention and may see others as being too sensitive, pessimistic or slow in their work.

NEGATIVE PERCEPTIONS OTHERS MAY HAVE OF MICHAEL

Others may view him as disinterested or "on a mission." Those with soft personalities may view him as insensitive, self-centered and bullish. Detail-oriented people may perceive him as having a "know-it-all" attitude. Others might also find him to be disorganized, inaccurate or one who exaggerates facts.

FIG. 13C

EXTERNAL ASPECTS

NOTABLE CHARACTERISTICS

Others may view Michael as being positive, persuasive and the "life of the party." Talking may be more important than listening. There is a tendency to be friendly as well as argumentative and persistent in the desire to achieve personal objectives. He is not afraid of new activities, challenges or people. He may thrive on taking calculated risks and has a deep desire for acceptance among peers.

FUNDAMENTAL DESIRES/DRIVE

Michael may exhibit an outgoing and uninhibited social style. There is a strong desire to control events, manage people, be persuasive and be well liked by others. He may prefer to first deal with the "big picture" before exploring the details and avoids specific components and routine that can get tiresome.

RECOMMENDED IMPROVEMENTS

While friendly, Michael may occasionally be viewed as inconsiderate. Suggest focusing on "listening to understand" rather than "talking to convince." He is likely to have a streak of independence and is reluctant to change his less desirable habits. Although he can see the "big picture", he may not fully understand the level of detailed work required. Seeking feedback from more detailed-oriented work associates and friends would help him understand the process involved and achieve results.

HOW TO SUPERVISE AND ENCOURAGE

Michael wants independence but needs to know there are limits to his personal authority. He needs to know why certain things are expected, as he works best with clear directions. This will allow for the highest level of performance. He may not respond well to close supervision, so avoid micromanaging. Michael needs a manager who is willing to discuss matters openly in a democratic lighthearted manner.

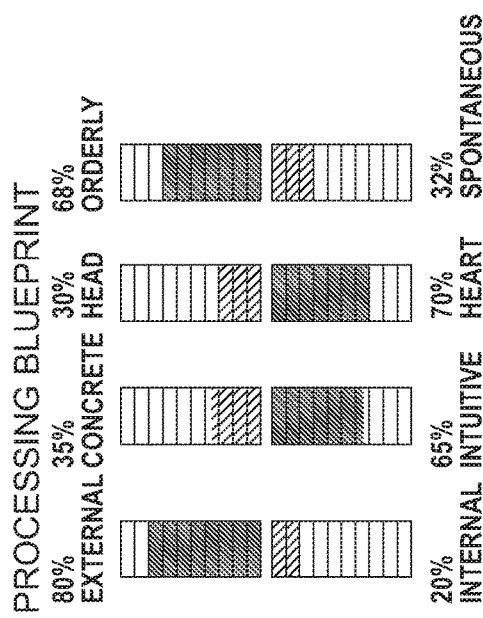

PROCESSING BLUEPRINT

80% 35% 30% 68%
EXTERNAL CONCRETE HEAD ORDERLY

20% 65% 70% 32%
INTERNAL INTUITIVE HEART SPONTANEOUS

PROCESSING BLUEPRINT

Michael is externally energized and he takes in information intuitively. He makes decisions with his heart and he relates to the external world in an orderly manner.

INTERNAL vs. EXTERNAL

Internally energized and externally energized are two different ways of relating to our environment. A person who is internally energized prefers to focus on the inner world of ideas and thought. Time alone for reflection is important. This person is not necessarily shy or unsociable. However, the externally energized person prefers to focus on people and activities, drawing energy from the external world, or those things in which he is involved.

| 20% INTERNALLY ENERGIZED | 80% EXTERNALLY ENERGIZED |
|---|---|
| Energized by inner experiences | Energized by people |
| Introverted | Extroverted |
| Reflects, then possibly acts | Acts, then possibly reflects |
| Is often reserved and quiet | Is often friendly and talkative |
| May sometimes be harder to get to know | Easy to get to know |
| More private and restrained | More expressive and unrestrained |
| Needs privacy | Needs engaging activity |
| Thinks before speaking and acting | Discovers thought as words are spoken |
| May seem withdrawn to the extrovert | May seem shallow to the introvert |
| Processes information inwardly | Processes information outwardly |

| INTUITIVE vs. CONCRETE | 65% INTUITIVE PROCESSOR | 35% CONCRETE PROCESSOR |
|---|---|---|
| At any given time a person is either taking in information or making decisions based upon information already received. Using concrete or intuitive data are two ways of perceiving information. The concrete processor prefers to utilize what can be actually seen, heard, touched, tasted, or smelled, rather than counting on possibilities of what could be. The intuitive processor prefers to gather information by application and thinking through as many different scenarios as possible. | Prefers imagining new possibilities and opportunities in life situations | Prefers handling the practical matters of life situations |
| | Definitely likes opportunities to be creative and inventive | Likes things that are definite and can be measurable |
| | Jumps in anywhere and tends to pass over the steps | Starts at the beginning, taking one step at a time |
| | May skip directions and tends to follow intuitive hunches | Reads instructions and notices the details of a given situation |
| | Likes change and variety in the job and personal life | Likes set procedures and the established routines |
| | Asks "What could I do if there are no limitations?" | Asks "What do I do in this situation?" |

FIG. 14B

| AFFECTIVE vs. COGNITIVE | 70% HEART (AFFECTIVE) | 30% HEAD (COGNITIVE) |
|---|---|---|
| People use both their head and heart in making decisions but typically prefer and are better at one over the other. The person that prefers the head (cognitive) function tends to make decisions based on what seems to be logical with objective information. This does not mean that the individual never makes decisions based on his heart. A person that prefers the heart (affective) function in making decisions is likely to be more person-centered and/or value-centered. This does not mean that this person is overly emotional or illogical. It is not suggesting that the individual will never make a decision based on his head. | Decides with the heart | Decides with the head |
| | Goes by a sense of personal convictions | Goes with what seems to make sense |
| | Concerned for relational harmony | Concerned for truth and justice |
| | Emotionally participates | Objectively is important |
| | May seem fuzzy-minded and emotional to the cognitive person | May seem aloof and condescending to the affective person |

| SPONTANEOUS vs. ORDERLY | 32% SPONTANEOUS | 68% ORDERLY |
|---|---|---|
| Orderly and spontaneous reflect different lifestyle orientations by which people relate to the external world. A person who has an orderly preference will generally relate to life by being more decisive, planned, structured and organized. Whereas, the person who is more spontaneous in preference will generally relate to life by being more flexible, adaptable, curious and quick to embrace the change that may come his way. | Prefers a flexible lifestyle and can adjust with the changes in life's situations | Prefers an organized lifestyle, tends to organize what is important and may let other things go |
| | Likes going with the flow and rolling with the punches | Likes definite order, structure and knowing what is to happen next |
| | Prefers to experience life as it happens | Likes to have life under control and somewhat predictable |
| | Likes the freedom to be able to explore with minimum limits | Likes to have clearly defined limits and categories |
| | Meets deadlines by the last minute rush with a touch of suspense | Feels comfortable establishing closure and getting something completed |
| | Fulfills tasks by a last minute sprint to the finish line | Enjoys deadlines and likes to plan in advance to prevent undue pressure |
| | May seem disorganized, messy and irresponsible to the orderly type of individual | May seem demanding, rigid and uptight to the spontaneous type of individual |

FIG. 14C

WHY IS MICHAEL MOTIVATED?

RECOGNITION FOR EFFORT 70%
VS. ATTAINMENT OF GOALS 30%
Michael is motivated by the recognition from others more than the pursuit and achievement of the goal or objective.

POWER 60%
VS. COMPLIANCE 40%
Michael is motivated by a capacity to manage people and circumstances well. This individual is more of an initiator than responder and is likely demotivated by being told what to do and how to do it.

AFFILIATION 90%
VS. ACTIVITY 10%
Michael is motivated by "who" is involved in a situation rather than "what" is being done.

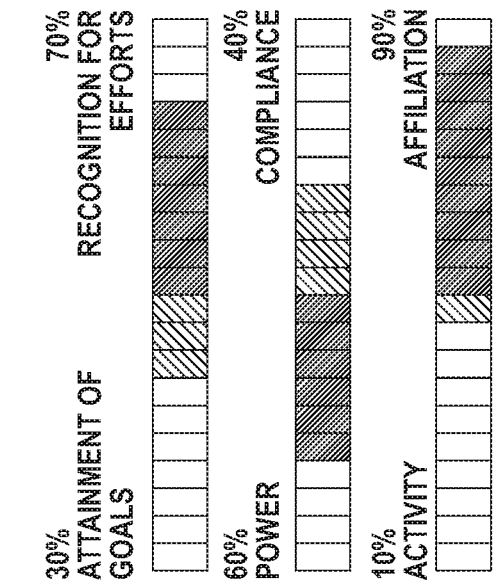

FIG. 15A

HOW IS MICHAEL MOTIVATED?

AFFIRMED BY OTHERS 75%
VS. SELF-AFFIRMED 25%
Michael finds self-esteem more through appreciation, encouragement and support of significant others, rather than experiencing self-esteem based on an internal sense of bringing a valued contribution to the surrounding environment.

EXCHANGE OF IDEAS 54%
VS. RECEIVE DIRECTION 46%
Michael shows a preference and is motivated by the opportunity to explore as well as to dialogue on ideas, strategies, vision and challenges. Michael is not as motivated by receiving direction without giving input.

FREEDOM 71%
VS. CONSISTENCY 29%
Michael is motivated by the freedom and the latitude to make the decision, adjustments and take action on matters deemed important. This individual is not necessarily as motivated by routines and will often invent new ways to avoid routine.

PREFERS PROCESS 58%
VS. TASK COMPLETION 42%
Michael is motivated by a preference to do the work well and stay with the process at hand. What is being done and how it is done are both important. Completing the task is not necessary to feel motivated or rewarded. Upon completion of a task or project this individual is usually ready to address the next process.

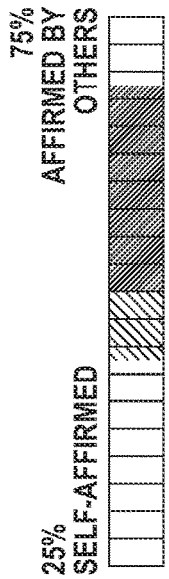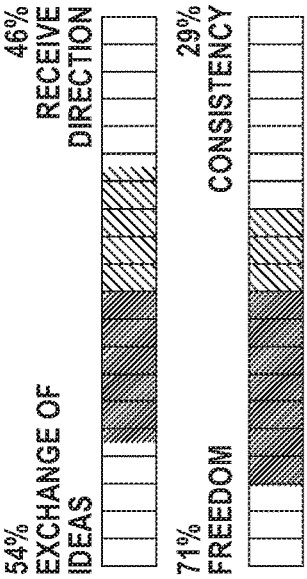

FIG. 15B

WHAT MOTIVATES MICHAEL?

WORK FUNCTION 100%
VS. WORK CONDITIONS 0%
Michael is not as motivated by an attractive environment, job security, appropriate compensation, adequate supervision, and satisfactory work conditions. Michael is motivated more by the challenge of achievement, recognition, advancement, and overcoming significant obstacles.

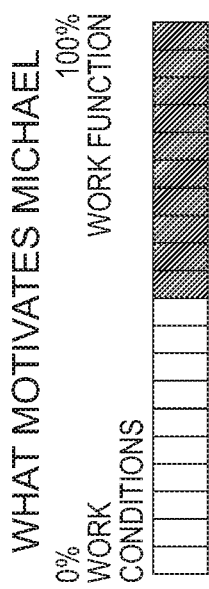

FIG. 15C

CONFLICT MANAGEMENT

Understanding the way we, as well as those with whom we interact, deal with conflict allows for more productive work relationships. Michael's style of dealing with conflict is primarily collaborating and secondarily competing.

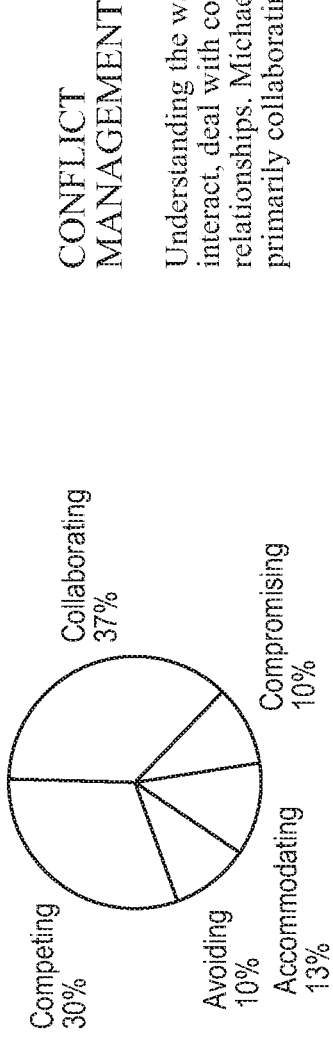

FIG. 16A

COLLABORATING
Primary conflict management style

POSTURE
"I can win and you can win too!"

ATTITUDE
"My preference is.. what is your preference?"

STRATEGY
Gathers information, looks for alternatives, open to dialogue, welcomes varied views and potential disagreement.

GOAL/RELATIONS
This style typically helps resolve, not create, problems. However, the collaborating person may become discouraged when others do not embrace the same positive approach.

INTERACTION
Focuses on information gathering.

PROBLEM AREAS
This person may become discouraged when taking a flexible stance but others do not respond back with a flexible attitude or posture.

COMPETING
Secondary conflict management style

POSTURE
"I will win. You will lose!"

ATTITUDE
"Do it my way or not at all."
"It's my way or the Highway!"

STRATEGY
Compete, control, outwit, coerce, fight, force, persist, "stick with it."

GOAL/RELATIONS
Places a high value on achieving personal goals, even at the risk of potentially disrupting the relationship.

INTERACTION
Impatient with dialogue and information.

PROBLEM AREAS
May be unaware of or demonstrate disregard for other's feelings.

FIG. 16B

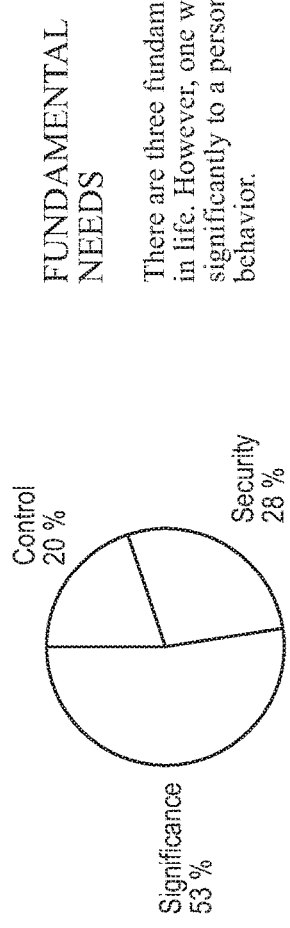

FUNDAMENTAL NEEDS

There are three fundamental needs that everyone experiences in life. However, one will usually dominate and contribute significantly to a person's outlook, attitude, motivation, and behavior.

20% CONTROL

Control manifests itself in efforts to influence or manage circumstances or people. It carries a longing for a setting that will allow the opportunity to control the work setting or have the power to manage people/events.

53% SIGNIFICANCE

Signifance comes by way of approval or affection from significant others. It brings a desire for a career setting that has a positive effect on others. This usually comes about through cooperative efforts or association with a particular group of people.

28% SECURITY

Security comes by way of acquisition of assets, position, education, or a sense of belonging. Those motivated by security are likely attracted to a career setting that provides for a stable future.

Principles that apply to Fundamental Needs

> One of the three Fundamental Needs will be dominant throughout most of a person's life, but many people will identify a Secondary Need as well.

> Fundamental Needs have a significant impact on one's attitude, behavior, and motivation in the work context.

> A mismanaged Fundamental Need can become a destructive force in any area of life.

> Setbacks may cause a temporary shift away from the Fundamental Need to the Secondary Need.

> Identifying a Fundamental Need can increase the understanding of a person's attitudes, motivation, and behavior.

FIG. 17

DECISION MAKING

People have four different ways of processing information and making decisions: Outward or Inward Processors, Careful or Rapid Deciders. Michael is an Outward Processor and a Rapid Decider.

OUTWARD PROCESSOR vs. INWARD PROCESSOR

*A 50/50 result indicates that a person's decision making varies based on the particular situation.*

75% OUTWARD PROCESSOR

Outward Processors often utilize interaction with others as a way to process information and arrive at a wise decision. They have a need to communicate their thoughts openly in order to discern which ideas best contribute to a wise decision. It is this interaction with others that allows them to convert an idea to a decision.

Others may think this type of person thinks out loud, allowing others to hear both their good and bad ideas. Some may get the impression that Outward Processors figure out what they think as they speak. Observers may not fully understand the need for engaging conversation in order for the Outward Processor to organize and clarify the thinking process.

25% INWARD PROCESSOR

Inward Processors usually keep their thoughts private until they are convinced that the ideas are sound. They sort through their thoughts privately, and discern which ideas best contribute to a wise decision. It is in their private world that they can solidify their decisions.

Others may think of this kind of person as one who holds their cards close or even as uptight about sharing thoughts. Some may get the impression the Inward Processor is unwilling to take the risk of sharing all their ideas. Inward Processors may be accused of not being open to the exchange of ideas, failing to fully understand their need for privacy in order to organize and clarify the thought process.

CAREFUL DECIDER vs. RAPID DECIDER

*A 50/50 result indicates that a person's decision making varies based on the particular situation.*

33% CAREFUL DECIDER

Careful Deciders usually have to investigate all the options before making a decision, wanting to be certain of the outcome. They tend to go step by step with a methodical style or processing information and arriving at a decision.

Others may see this kind of person as bogging down the process or as being overly concerned with small matters.

67% RAPID DECIDER

Rapid Deciders have a quick sense of what will work and are able to intuitively process information and arrive at a decision without the need to go step by step.

Others may see this kind of person as rushing to judgment, carelessly making decisions, which may or may not be the case.

FIG. 18B

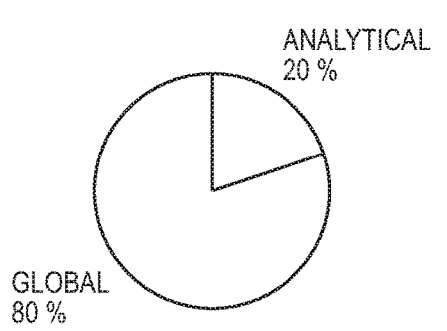

PRIMARY LEARNING STYLE
GLOBAL

A global learner sees the big picture or overall view, while the analytical learner focuses on the parts that make up the big picture. Global learners hear new information by listening to the "gist" of what is being communicated, quickly getting the main idea or topic. Remembering the details may be somewhat difficult. In following directions the Global learner listens for "what is supposed to be done", not necessarily "how to do it".

GLOBAL LEARNER VS. ANALYTICAL LEARNER

Learning Style explains how the individual interacts with new information. There are two extremes: the global learning style and the analytical learning style. No person is bound by one learning style. However, even though individuals find themselves in both categories, they gravitate toward just one style.

80% GLOBAL LEARNER CHARACTERISTICS

- Learns by discussion and cooperates in group efforts
- Does several things at once and may skip steps/details
- Sees the big picture and relationships between ideas
- Read between the lines and sees many options
- Works hard to please and tries to avoid conflict
- Goes with the flow and is generally flexible
- Tends to avoid individual competition
- Paraphrases in explaining a perspective

GLOBAL LEARNER FRUSTRATIONS

- Having to show the steps used to arrive at a particular answer
- Accepting criticism of others without taking it personally
- Not knowing the purpose for doing a particular task
- Not receiving enough credit for the efforts made
- Having to explain something analytically and in detail

20% ANALYTICAL LEARNER CHARACTERISTICS

- Likes going step by step in a sequential order
- Typically self-motivated, logical and focused
- Must be prepared and needs to know what to expect
- Pays close attention to details and specifics
- Can find the facts but may miss the main idea
- Often values facts over intuition and feelings
- Remembers specifics and prefers organization
- Prefers to finish one thing at a time
- Has a sense of fairness
- May prefer direct answers

ANALYTICAL LEARNER FRUSTRATIONS

- Listening to a long explanation when all that is needed is a simple "yes," or "no" response
- Listening to an overview without knowing the steps involved
- Not understanding how an employer/instructor evaluates
- Not finishing one task before going on to the next
- Having opinions expressed as fact without evidence
- Not having an understanding of the purpose of the task
- Dealing with broad generalities and not having the specifics PRISM LENS                                                                    Archives
―304

The SurePeople PRISM Lens is a powerful way to learn how others perceive you. How you're perceived is significant for growing your emotional, relational and team intelligence (ERT-i). Invite up to five trusted friends or colleagues at a time to take the Lens. Simply archive Lens results and invite more people for additional perspective. Each Lens results will uncover ERT-i opportunities by affecting the weighting of practice areas in your development plan.

INVITE FIVE PRISM LENS INDIVIDUALS

Please invite five individuals (i.e. manager, co-workers, customers and family) you have known or worked with for at least six months to participate in PRISM Lens. The results of this PRISM Lens will be synthesized into actionable data to help identify practice areas for your development plan

+ REQUEST PRISM LENS

+ REQUEST PRISM LENS

+ REQUEST PRISM LENS

+ REQUEST PRISM LENS

+ REQUEST PRISM LENS

FIG. 22

EMOTIONAL, RELATIONAL AND TEAM INTELLIGENCE (ERT-i)

This is your work area for a personalized approach to strengthening your Emotional, Relational and Team Intelligence (ERT-i)™. Obtaining high ERT-i includes assessing aspects of what makes you unique and continually practicing personal improvement. To get you started, we offer intelligent recommendations on which practice areas to focus on based on your strengths and growth opportunities that are derived from your PRISM Portrait and PRISM Lens results. Perform at your highest potential by regularly engaging your practice areas and putting development strategies to work for you.

PRACTICE AREAS

Seeking Feedback △ — 310
Managing Emotions — 310
Giving & Receiving Feedback
Personal Fulfillment
Drive Action
Delegation
Add/Remove Practice Areas — 355
Customize your ERT-i Auto Learning  On ◉
Mobilize your development by turning on auto learning which will deliver lessons directly to you email.

Knowledge Center — 352
Explore a wide variety of topics in ERT-i practice areas. Browse through a hand-picked collection of videos. Articles and podcasts in the Knowledge Center.

VISIT KNOWLEDGE CENTER — 338

SEEKING FEEDBACK — 310

Discern how and when to solicit feedback that will help improve performance. — 324

Recommended By Prism, Prismlens — 326

Development Strategies — 330

Created by executive coaches and industry experts, development strategies are crucial to applying your ERT-i learning in everyday situations. Together with your tactics for improvement these developmental concepts combine on-demand coaching with a step- by-step methodology to help you adopt personal enrichment and carry out lasting change.

1 Research and study effective ways to ask open-ended questions
360 — to solicit feedback. — 332
   📝 Post a Note | 💬 Request Feedback — 362

2 Be open and ask others what more you can do to succeed in your work; assume each person has meaningful and helpful advice
   📝 Post a Note | 💬 Request Feedback — 334

Knowledge Building — 337

Support your ERT-i development efforts with noteworthy content from leading publishers, thought leaders and experts. Use relevant knowledge -building content to gain a better understanding of how ERT-i topics apply to real- world scenarios.

FILTER BY: ALL | EDITOR'S CHOICE | FAVORITES | BOOKMARKS | COMPLETED

MEDIA TYPE  [ All  ◆ ]

5 Ways to Make The Most Out Of Having a Mentor
By *Contributor One, Contributor Two* | Editor's Choice

| PRACTICE AREAS | MANAGING EMOTIONS |  Recommended By Prism, Prism Lens |
|---|---|---|
| Seeking Feedback | Determine ways to maintain objectivity and manage emotions during trying circumstances. | |
| Managing Emotions △ | | |
| Giving & Receiving Feedback | Development Strategies | |
| Personal Fulfillment | Created by executive coaches and industry experts, development strategies are crucial to applying your ERT-i learning in everyday situations. Together with your tactics for improvement these developmental concepts combine on-demand coaching with a step-by-step methodology to help you adopt personal enrichment and carry out lasting change. | |
| Drive Action | | |
| Delegation | | |
| Add/Remove Practice Areas Customize your ERT-i | 1 Focus on the facts in a situation; stay calm and follow up at a later time when you can maintain objectivity and make meaningful progress. | |
| Auto Learning  on ⬤ | 📝 Post a Note \| 💬 Request Feedback | |
| Mobilize your development by turning on auto learning which will deliver lessons directly to you email. | 2 ...... | |
| Knowledge Center | 3 ...... | |
| Explore a wide variety of topics in ERT-i practice areas. Browse through a hand-picked collection of videos. Articles and podcasts in the Knowledge Center. | 4 Objectively examine how you react in tense situations. Gauge yourself by comparing your reactions to those of people you admire. | |
| | 📝 Post a Note \| 💬 Request Feedback | |
| VISIT KNOWLEDGE CENTER | | |

FIG. 23B

PRACTICE AREAS

Seeking Feedback
Managing Emotions

Giving & Receiving Feedback △

Personal Fulfillment

Drive Action

Delegation

Add/Remove Practice Areas
Customize your ERT-i

Auto Learning  On ◯

Mobilize your development by turning on auto learning which will deliver lessons directly to you email.

Knowledge Center

Explore a wide variety of topics in ERT-i practice areas. Browse through a hand-picked collection of videos. Articles and podcasts in the Knowledge Center.

VISIT KNOWLEDGE CENTER

---

GIVING & RECEIVING FEEDBACK

Recommended By
Prism, Prism Lens

Learn how to better give and receive feedback for the sake of improving performance.

Development Strategies

Created by executive coaches and industry experts, development strategies are crucial to applying your ERT-i learning in everyday situations. Together with your tactics for improvement these developmental concepts combine on-demand coaching with a step-by-step methodology to help you adopt personal enrichment and carry out lasting change.

1 Ask yourself how you can best convey your desire to help and support others.

📝 Post a Note | 💬 Request Feedback

2 ......

3 ......

4 Identify and explain several ways you think your critique is beneficial.

📝 Post a Note | 💬 Request Feedback

FIG. 23C

FIG. 23D

| PRACTICE AREAS | DRIVE ACTION |
|---|---|
| Seeking Feedback | Develop the capacity to move from theory to application and drive progress on work efforts. Recommended By Prism, Prism Lens |
| Managing Emotions | Development Strategies |
| Giving & Receiving Feedback | Created by executive coaches and industry experts, development strategies are crucial to applying your ERT-i learning in everyday situations. Together with your tactics for improvement these developmental concepts combine on-demand coaching with a step-by-step methodology to help you adopt personal enrichment and carry out lasting change. |
| Personal Fulfillment | |
| Drive Action | 1 Identify your objectives and write down three to five steps for each that are essential to succeed. |
| Delegation | Post a Note \| Request Feedback |
| Add/Remove Practice Areas Customize your ERT-i | 2 ..... |
| Auto Learning  On | 3 ..... |
| Mobilize your development by turning on auto learning which will deliver lessons directly to you email. | 4 ..... |
| Knowledge Center | 5 Encourage others to help you by articulating a plan and requesting their advocacy. |
| Explore a wide variety of topics in ERT-i practice areas. Browse through a hand-picked collection of videos. Articles and podcasts in the Knowledge Center. | Post a Note \| Request Feedback |
| VISIT KNOWLEDGE CENTER | |

FIG. 23E

ADD/REMOVE PRACTICE AREAS

[All Practice Areas ▼] [Search 🔍]                                ⬡

Seeking Feedback                                    [REMOVE]

Discern how and when to solicit feedback that will help improve performance.
View development strategies (5)

Recommended By: Prism, Prism Lens

Giving & Receiving Feedback                         [REMOVE]

Learn how to better give and receive feedback for the sake of improving performance.
View development strategies (4)

Recommended By: Prism, Prism Lens

Managing Differences                                [ADD]

Address conflict before it happens by celebrating individuality and building better relationships.
View development strategies (5)

Recommended By: Prism, Prism Lens

Appreciation & Recognition                          [ADD]

Grasp a full understanding of people to better show recognition of and gratitude for the work of others.
View development strategies (4)

Recommended By: Prism, Prism Lens

---

CUSTOMIZE YOUR ERT-i

Prioritize your practice areas by dragging them up or down the list below. Select up to 12 by adding or removing them on the right. — 344

[UPDATE] [CANCEL]

- ⇔ Seeking Feedback 342 ⊗
- ⇔ Managing Emotions ⊗
- ⇔ Giving & Receiving Feedback ⊗
- ⇔ Personal Fulfillment ⊗
- ⇔ Drive Action ⊗
- ⇔ Delegation ⊗

Compassion [ADD]

Establish a sense of regard for the emotions and feelings of others.
View development strategies (4)
Recommended By: Prism,Prism Lens

Time Management [ADD]

Achieve goals and meet deadlines with strategies and techniques that maximize productivity and manage workloads
View development strategies (4)
Recommended By:Prism

Managing Differences [REMOVE]

Address conflict before it happens by celebrating individuality and building better relationships.
View development strategies (4)
Recommended By: Prism

Forethought & Planning [ADD]

Learn to think before you act, develop a more robust thought process and use a methodical approach to organizing and executing work.
View development strategies (4)
Recommended By: Prism Lens

FIG. 24C

Setting Expectations
Explore step-by-step processes for gaining results by expressing key needs and intentions.
View development strategies (4)
Recommended By: Company A

[ADD]

Showing Consideration
Interpret how and when to adjust to the needs of others through a more attentive, helpful interpersonal
View development strategies (5)
Recommended By: Company A

[ADD]

FIG. 26A

Today's lesson from your Strategic Communication practice area is:

Body Language Rules To Help You Command A Room
Contributor B

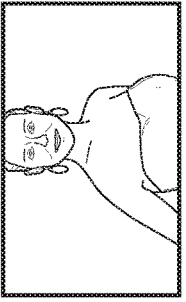

If there's one force that can either sabotage or propel your message, it's your body. With it, we can signal that we own the stage or that we bring irreplaceable value and importance to a meeting. Conversely, we can communicate through our bodies that we're not totally bought in to our ideas... or ourselves. With so much body language advice pointed at women—and it seems there are hundreds of do's and don'ts—some professionals are more than overwhelmed with advice, they're paralyzed by it.

Read Article
You're on the right track to personal development and mastering your emotional, relational and team intelligence (ERT-i). The practice areas in your development plan are adding a wealth of material for your customized learning objectives. We'll continue to send more content based on the practice areas you have set up. Be sure to manage your Development Plan to further customize your learning.

FIG. 25

Practice Areas
Select Practice Area
SEARCH

- Active Listening: The Speaking and Listening Balance
  By John Doe
- Strategic Thinking Skills for Leaders
  By Josh Doe
- 10 Steps To Effective Listening
  By Jane Doe Top Rated

- 2 Little Words That Have a Huge Impact at Work
  By Mary Doe
- You're More Biased Than You Think
  By Joan Doe
- The Definitive Guide to Winning an Argument
  By Jude Doe

CROSS CULTURAL AWARENESS

You're Intelligent, Aren't You?
John Doe

There's been somewhat of an explosion of multiple intelligences. Our once revered intellectual quotient, IQ, has been under attack for years now from the new generation of intelligences. Once upon a time, you just had to be smart, but today your IQ alone doesn't cut it.

Read Article

ENCOURAGING INNOVATION

Top 5 Leadership Predictions That Will Impact Business Evolution
Jake Doe, Contributor Over the past several years, I've witnessed the decline of courageous leadership in American enterprise. Rather than welcome change to evolve, leaders play safe. Where are the leaders with the strategic focus and wisdom to take a leap of faith and the tenacity to find new ways?

Read Article

MOTIVATE & INSPIRE

Women: Lift As You Climb
Alice Doe, Contributor

Having worked in a poorly managed all-women team early in my career, I know first hand how bitchiness can siphon the joy from even the best job. It's important to remember that if these women weren't so insecure to begin with, they wouldn't need to pull others down.

Read Article

FIG. 26B

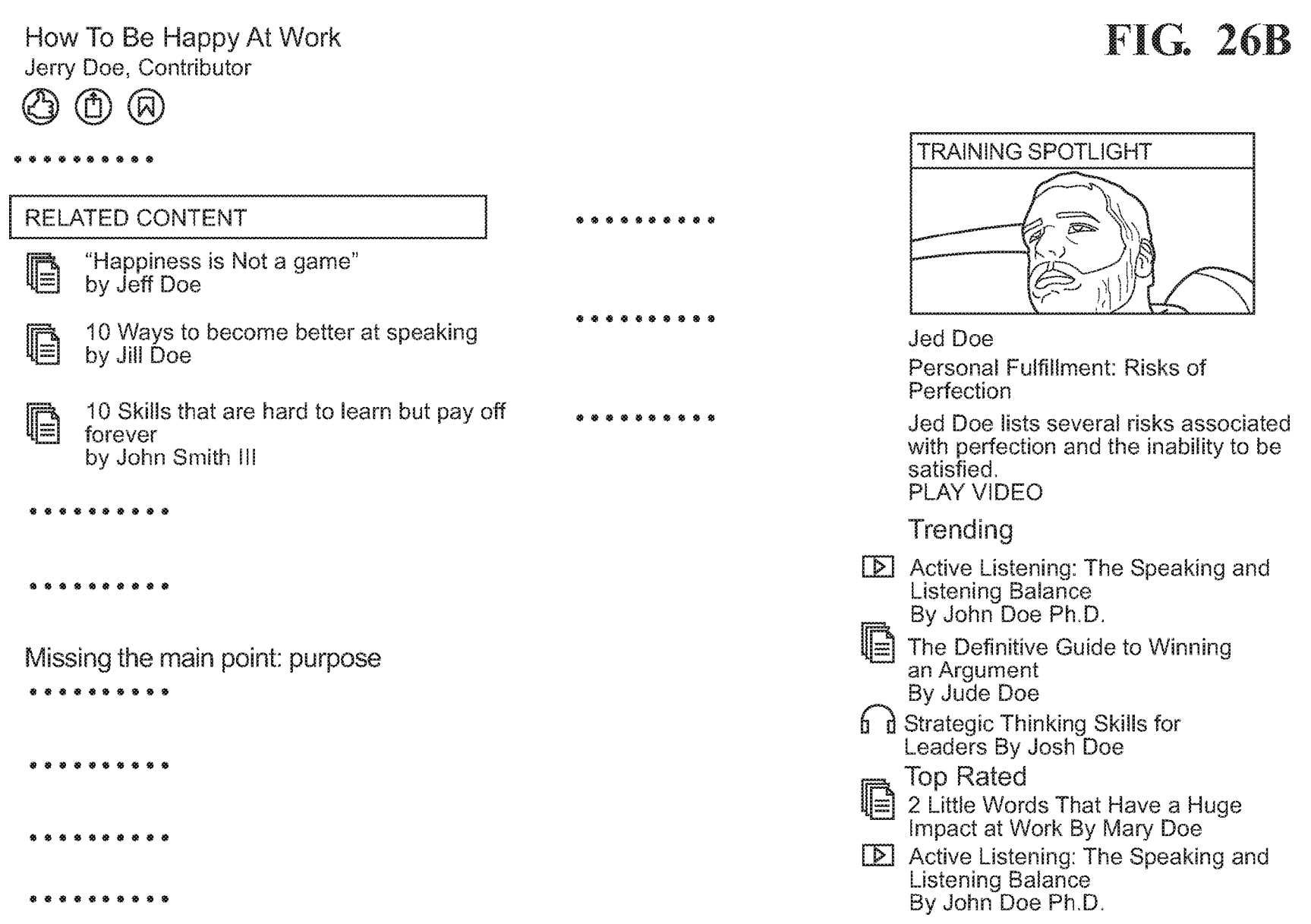

How To Be Happy At Work
Jerry Doe, Contributor

RELATED CONTENT

"Happiness is Not a game"
by Jeff Doe

10 Ways to become better at speaking
by Jill Doe

10 Skills that are hard to learn but pay off forever
by John Smith III

Missing the main point: purpose

TRAINING SPOTLIGHT

Jed Doe
Personal Fulfillment: Risks of Perfection

Jed Doe lists several risks associated with perfection and the inability to be satisfied.
PLAY VIDEO Trending Active Listening: The Speaking and Listening Balance
By John Doe Ph.D.

The Definitive Guide to Winning an Argument
By Jude Doe

Strategic Thinking Skills for Leaders By Josh Doe

Top Rated

2 Little Words That Have a Huge Impact at Work By Mary Doe

Active Listening: The Speaking and Listening Balance
By John Doe Ph.D.

DATA DRIVEN INTELLIGENT LEARNING AND DEVELOPMENT APPARATUS AND METHOD

BACKGROUND

The present apparatus and method relates to individual's trait learning and/or development tools for an individual's traits.

Successful businesses require a motivated team of employees and administrators working toward a common business goal. However, every person has different traits, motivation, intelligence, and other personality characteristics which make team interaction and achievement of business goals a hit or miss prospect at best.

An assessment can measure an individual's emotional intelligence, relational intelligence and team intelligence by analyzing multiple unique traits based on a plurality of attributes. Assessing these attributes in the company's employees enables the business administrator to better understand their employees' personalities, strengths, growth opportunities and capacities.

Once an individual's strengths and weaknesses have been determined, it would be desirable to develop a planned learning and development program can be developed to improve or maintain the individual's strengths, as well as to improve the individual's weaknesses.

SUMMARY

A data driven intelligent learning and development method includes accessing assessments of an individual relating to at least one trait of the individual, preparing a list of skill practice areas for the individual relating to personal skills and characteristics of the at least one trait, providing for each practice area, at least one development strategy for enhancing and/or maintaining the skills of the individual in each practice area, and presenting at least one practice area with at least one development strategy associated to the individual.

The method can include presenting a list of practice areas to the individual by ranking the practice areas from the practice areas requiring the most learning of the individual to the practice areas requiring a lesser amount of learning.

The method can also allow customizing of the ranking of the of the listed practice areas by the individual.

The method can include providing of a learning schedule for the individual for at least one of each practice area and at least one development strategy. The method can include providing at least two individually selectable learning schedules, each learning schedule presenting one of a new practice area or a new development strategy to the individual at different time intervals.

The method can also include providing the at least two learning schedules as providing one of a selectable self-pace learning schedule by the individual, and an automatic learning schedule presenting at least one of a practice and at least one development strategy to the individual on a periodic time basis.

The method can further include allowing access to a knowledge center by the individual, where the knowledge center contains selectable media to enhance and/or maintain the individual's skill for at least one of a practice area and a development strategy.

The method can include visually presenting a plurality of practice areas for selection by the individual. The method can allow the individual to add or remove practice areas from the list of practice areas using the plurality of practice areas for selection.

The method can allow the individual to reorder the practice areas in the list of practice areas displayed to the individual.

The method can include providing a periodic reminder to the individual related to a development strategy provided to the individual.

An apparatus for individual learning and development to improve personal traits of an individual includes a computer processor with a memory, the computer processor accessing trait assessment data of one individual, an accessible store containing a plurality of practice areas to develop skills of an individual, each practice area each having at least one development strategy to enhance and/or maintain an individual's skill in the related practice area. The computer processor executes program instructions to access an assessment of the individual relating to traits of the individual, preparing a list of skill practice areas for the individual relating to the trait assessment, providing for each practice area at least one development strategy directed to the skill level of the individual in the practice area, and presenting at least one practice area with at least one development strategy associated with the at least one practice area to the individual. An interactive processor and display is used to present the practice areas and the development strategies to the individual.

The apparatus further can include access to a knowledge base media store of selectable skill improvement based media.

The computer processor can further execute control program instructions to create a learning schedule for an individual of at least one of each practice area and development strategy.

DETAILED DESCRIPTION OF THE DRAWING

The various features and advantages of the present data driven intelligent learning and development apparatus and method will be better understood by referring to the detailed description and drawing in which like reference numbers refer to like elements unless otherwise noted.

FIG. 5 is a flow diagram of a business sequence to take a PRISM LENS™ assessment.

FIG. 6 is a flow diagram of an individual sign up procedure for the data driven assessment apparatus and method.

FIGS. 11A-11I are pictorial representations of sample assessment questions.

FIGS. 12A-12D show a pictorial representation of an assessment report of an individual's primary personality.

FIGS. 13A-13D show a pictorial representation of personality under pressure assessment results of an individual.

FIGS. 14A-14C show a pictorial representation of temperament assessment results of an individual.

FIGS. 15A-15C show a pictorial representation of motivation assessment results of an individual.

FIGS. 16A and 16B show a pictorial representation of conflict management assessment results of an individual.

FIG. 17 is a pictorial representation of fundamental need assessment results of an individual.

Figure 18A:
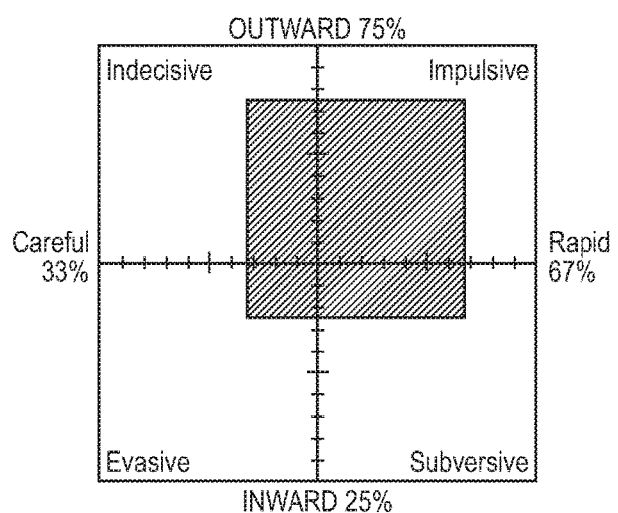

FIGS. 18A and 18B shown a pictorial representation of decision making assessment results of an individual.

FIGS. 19A and 19B show a pictorial representation of primary learning style assessment results of an individual.

Figure 20A:
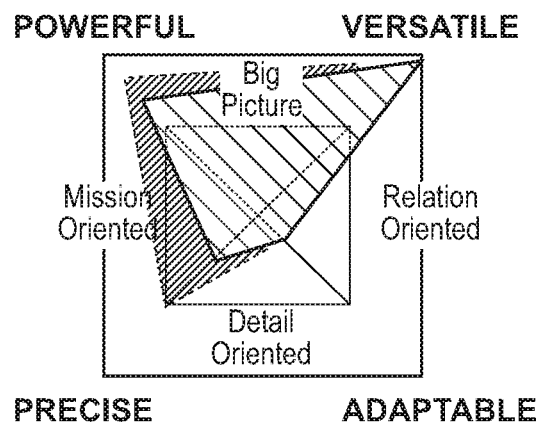
Figure 20B:
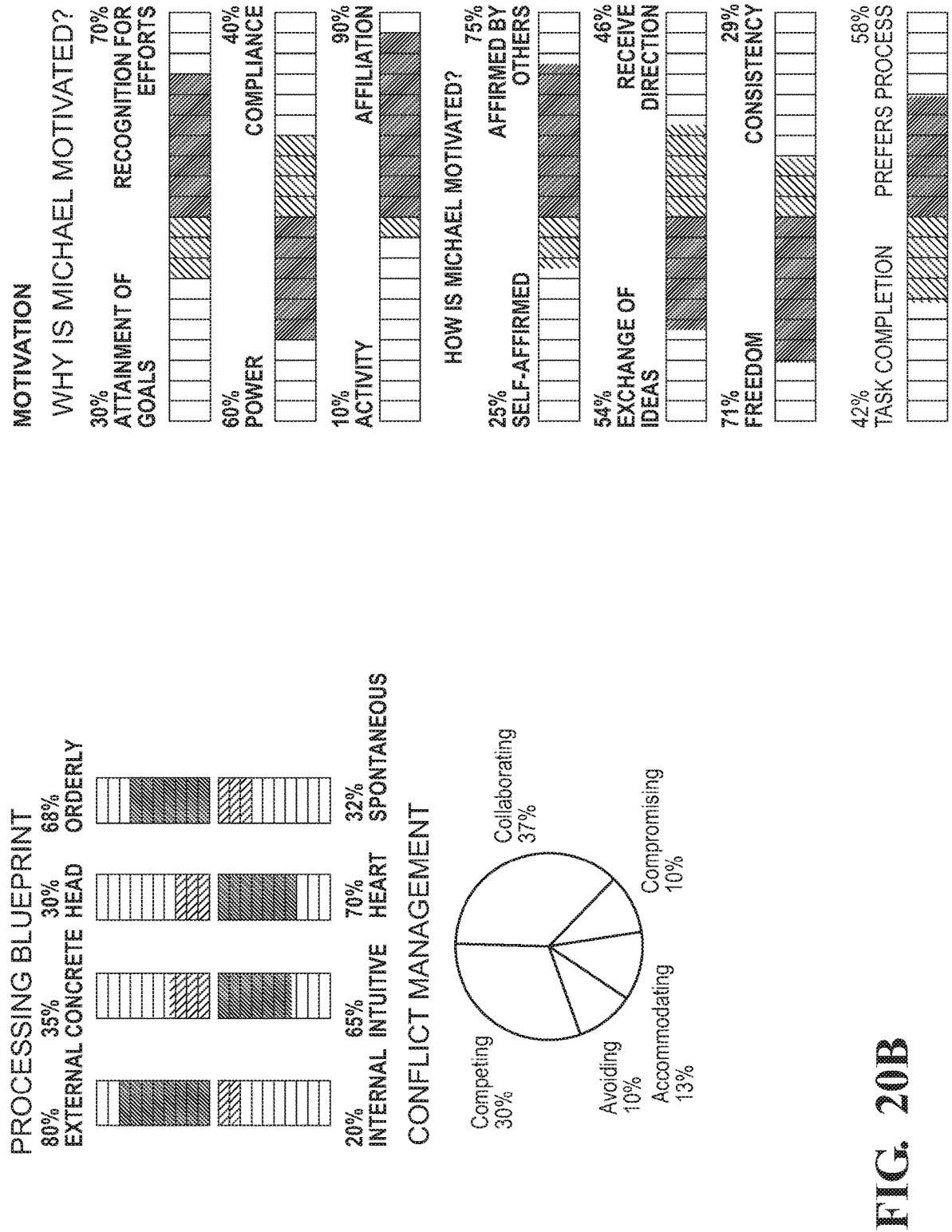
Figure 20C:
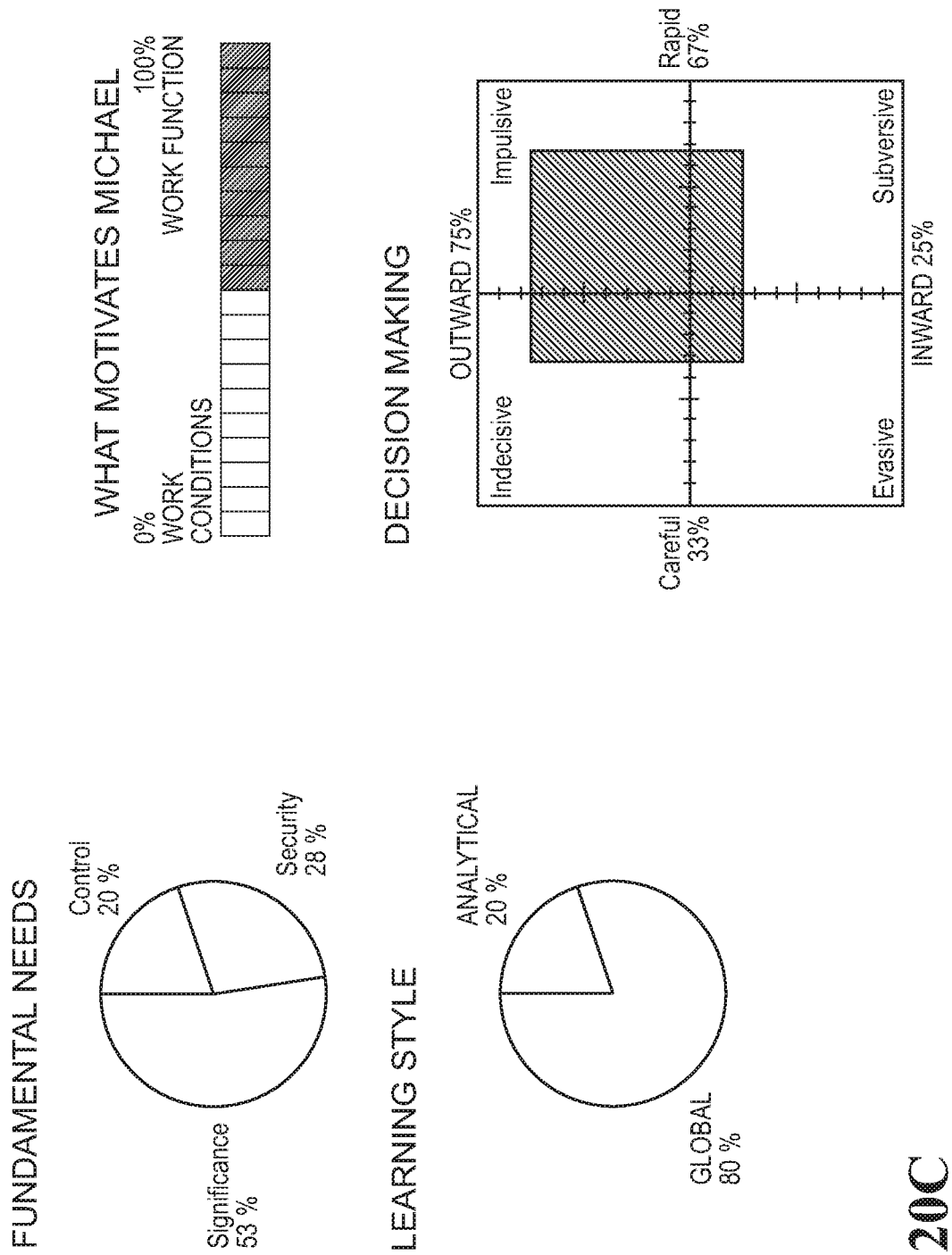

FIGS. 20A-20C show a pictorial representation of the combined assessment results depicted in FIGS. 12A-19B.

Figure 21A:
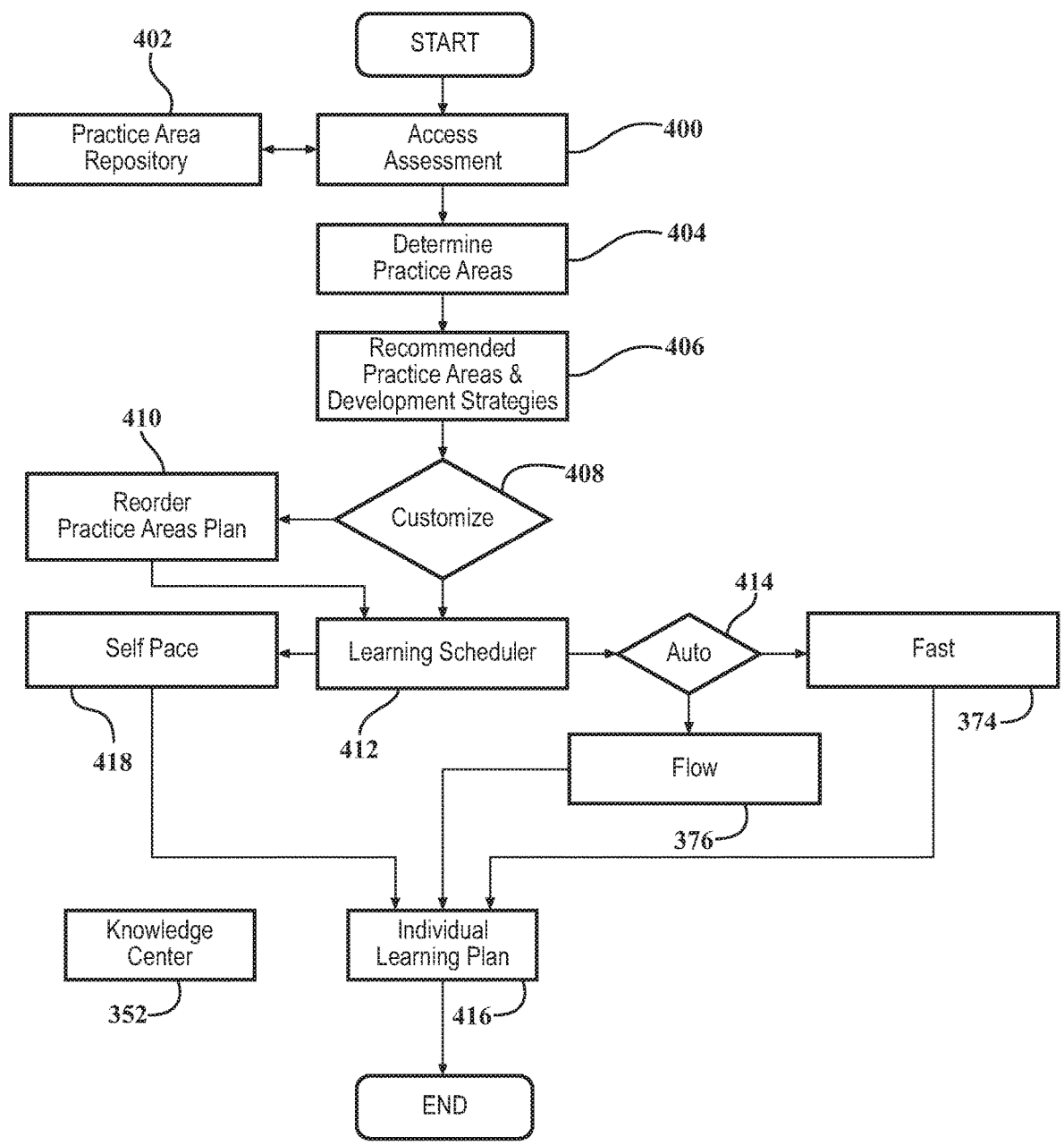

FIG. 21A is a flow chart of the sequence of the data driven intelligent learning and development apparatus and method.

Figure 21B:
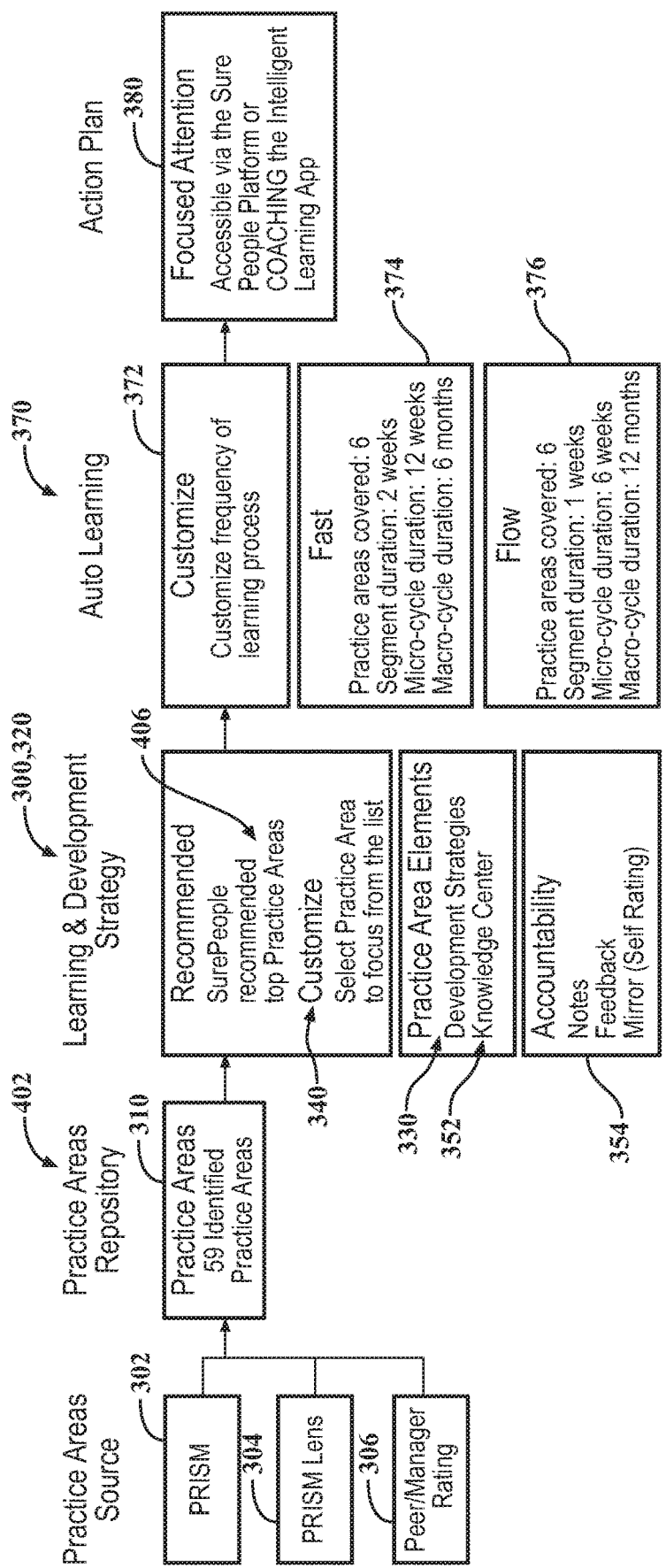

FIG. 21B is a block diagram of the major elements of the apparatus and method shown in FIG. 21A.

FIG. 22 is a screen display of the PRISM LENS™ assessment selection tool.

FIGS. 23A-23E are pictorial representations of different practice areas and related development strategies.

FIGS. 24A-24C show a pictorial representation of various practices areas available in the apparatus and method.

FIG. 25 is a pictorial representation of an example of the knowledge center.

FIG. 26A is a pictorial representation of a daily lesson provided by the apparatus and method.

FIG. 26B is a pictorial representation of media available from the knowledge center for the apparatus and method.

DETAILED DESCRIPTION

Figure 1:
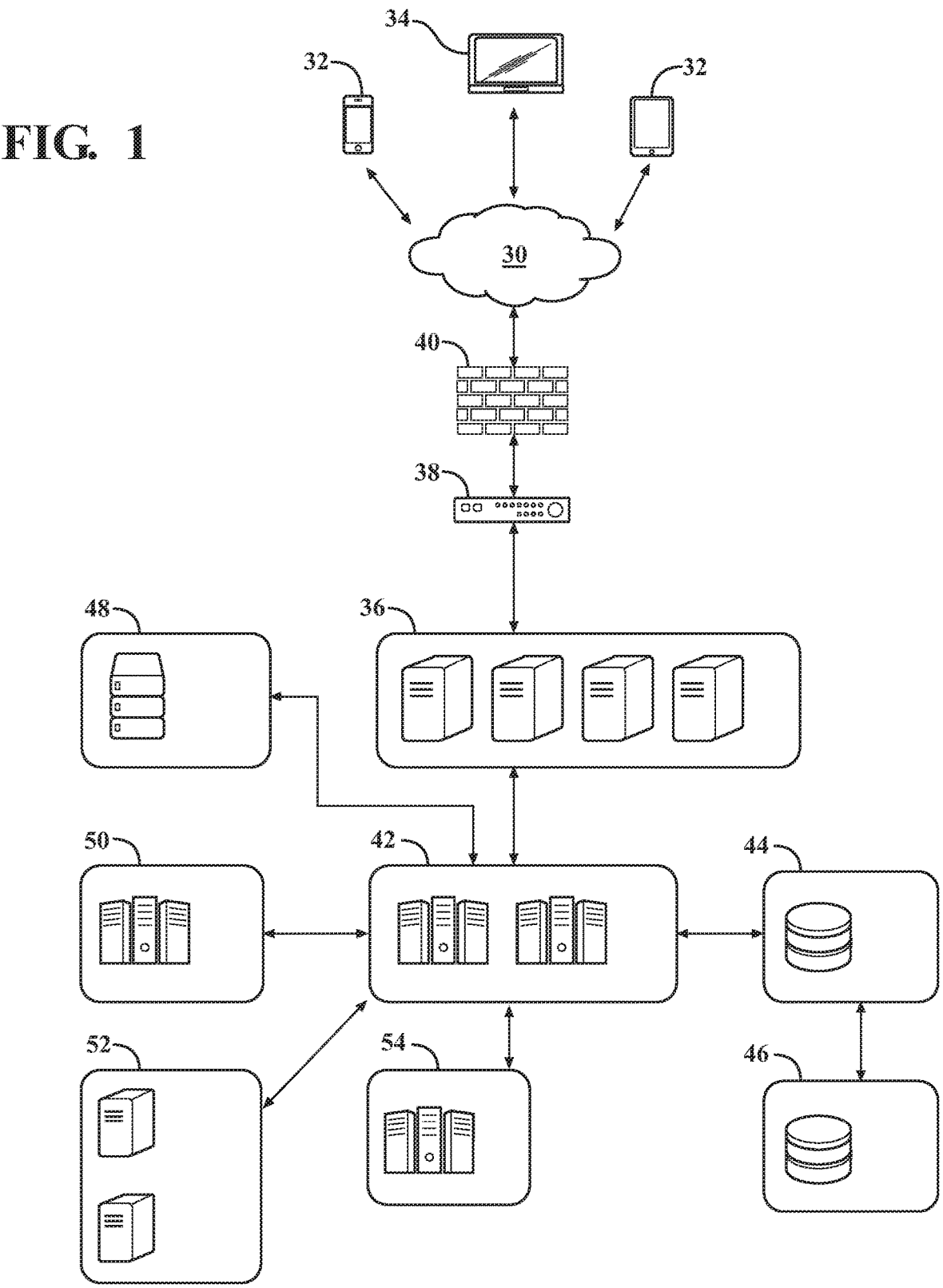
FIG. 1 is a block diagram of the components of the data driven assessment apparatus.

FIG. 1 depicts a cloud-based apparatus using a network, such as the worldwide web 30, for interaction between employers and employee via smartphones 32 and computers 34 to acquire employee assessment information, as well as reporting the results of such information to business management or to the individual.

As shown in FIG. 1, the apparatus, by example, includes a computer processor, which can be in the form of one or more web servers 36 connected to the worldwide web 30 through a load balancer 38 and a firewall 40. The web servers 36 communicate with one or more application servers 42. The application servers 42 communicate with database servers 44 and backup database servers 46, as well as data storage servers 48, a payment gateway server 50, a third party content services server 52 and CMS servers 54 (central management servers).

The present apparatus and method provide assessment-related reports to both business management and employees. The business side of the apparatus and method will first be described.

A business administration portion of the apparatus and method is shown in FIGS. 2A-11I and is accessible by at least one or more individual processors, such as a smartphone 32 or a computer 34 at a business site through the worldwide web 30 to the central computer processor system shown in FIG. 1.

Figure 2A:
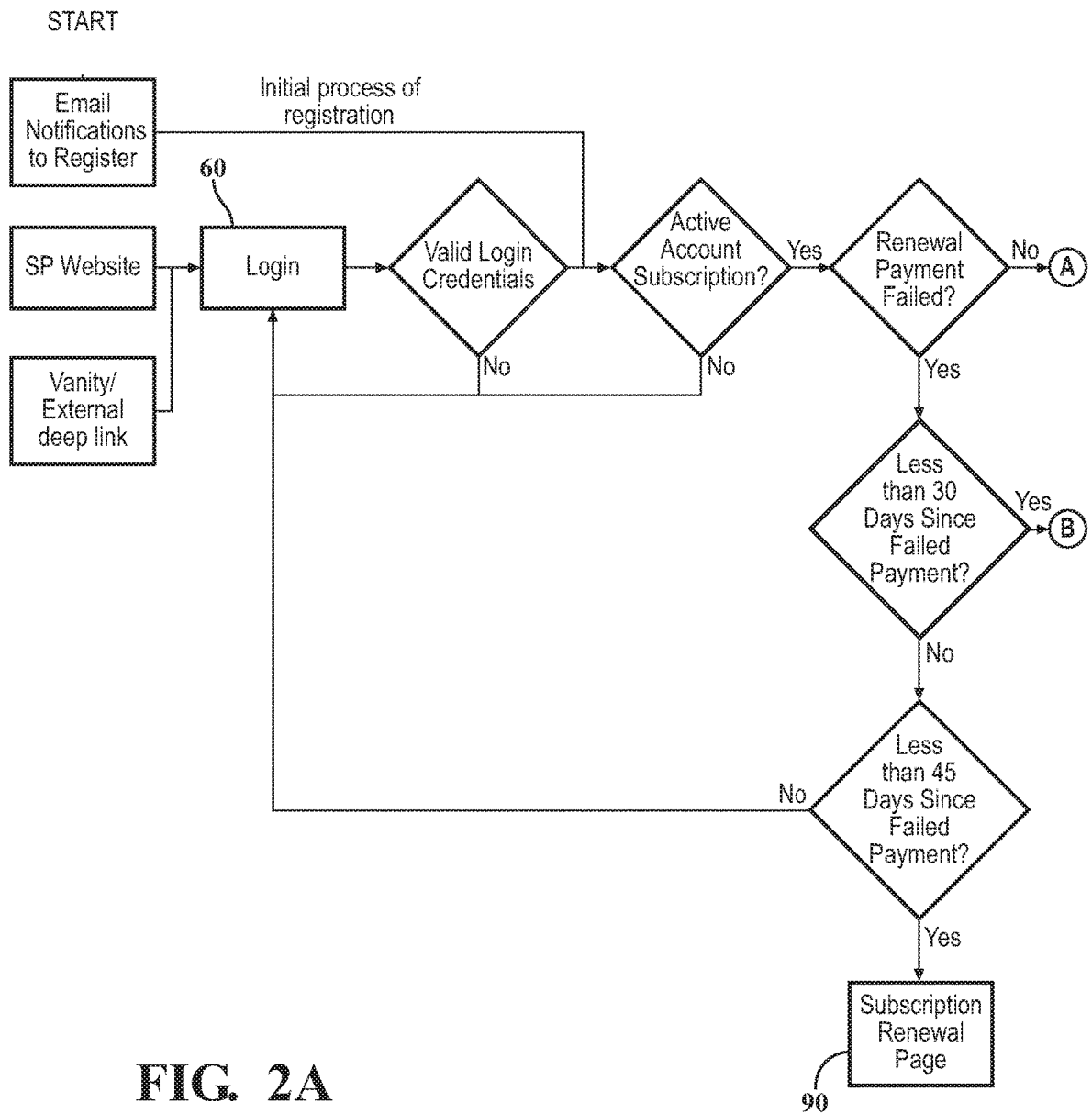
FIGS. 2A and 2B show a flow diagram of the business administrator login procedure for the data driven assessment method.
Figure 2B:
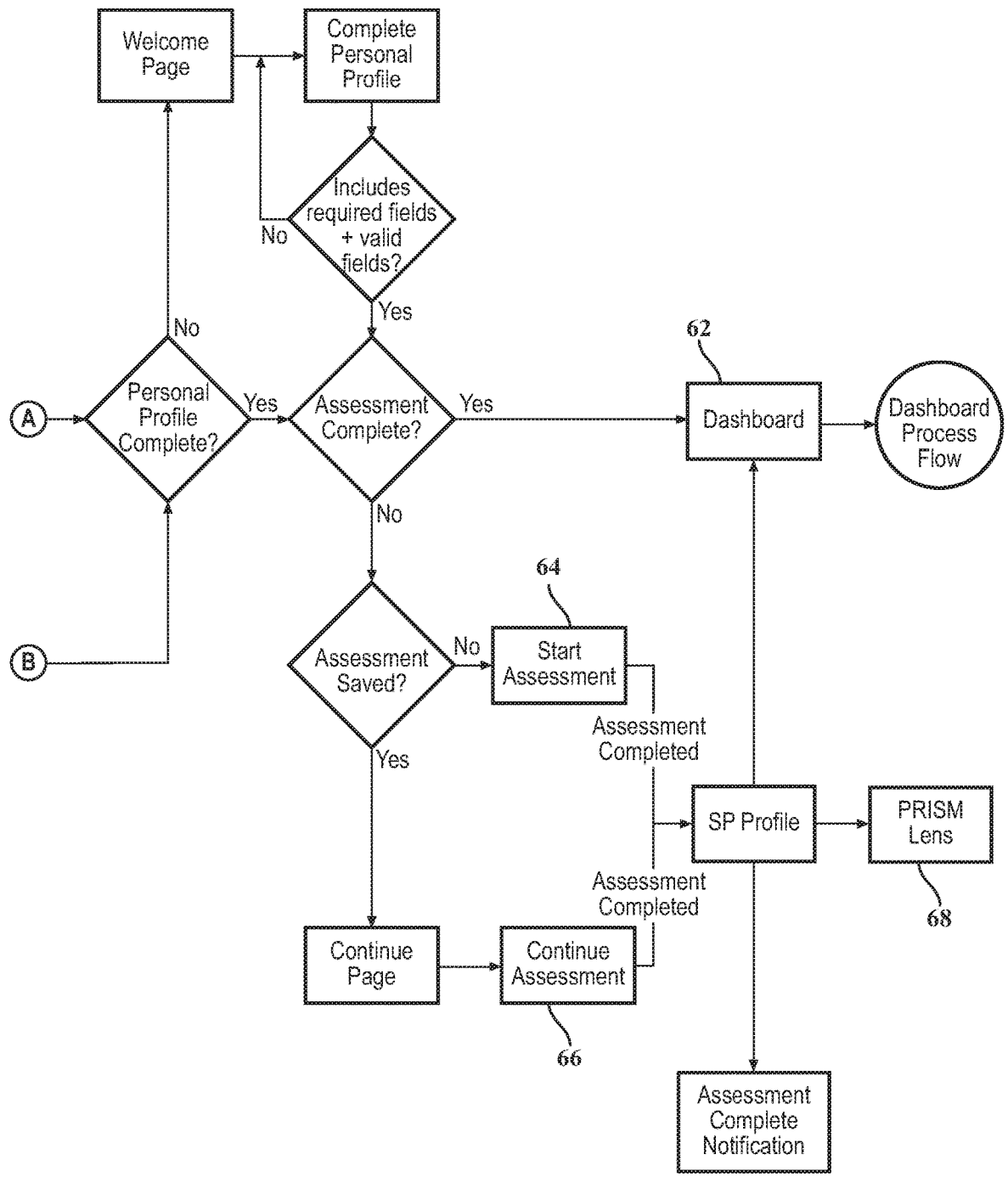

As shown in FIGS. 2A and 2B, a business administrator can log-in in step 60 to open or access an assessment account. Such accounts include business profiles, subscription renewal services, etc. A dashboard 62 displayed on a computer monitor at the business site allows access by the business administrator to various parts of the employee assessment apparatus and method, including starting an assessment in step 64, continuing an assessment 66, and using the assessment results to create an employee profile in step 68.

Figure 3A:
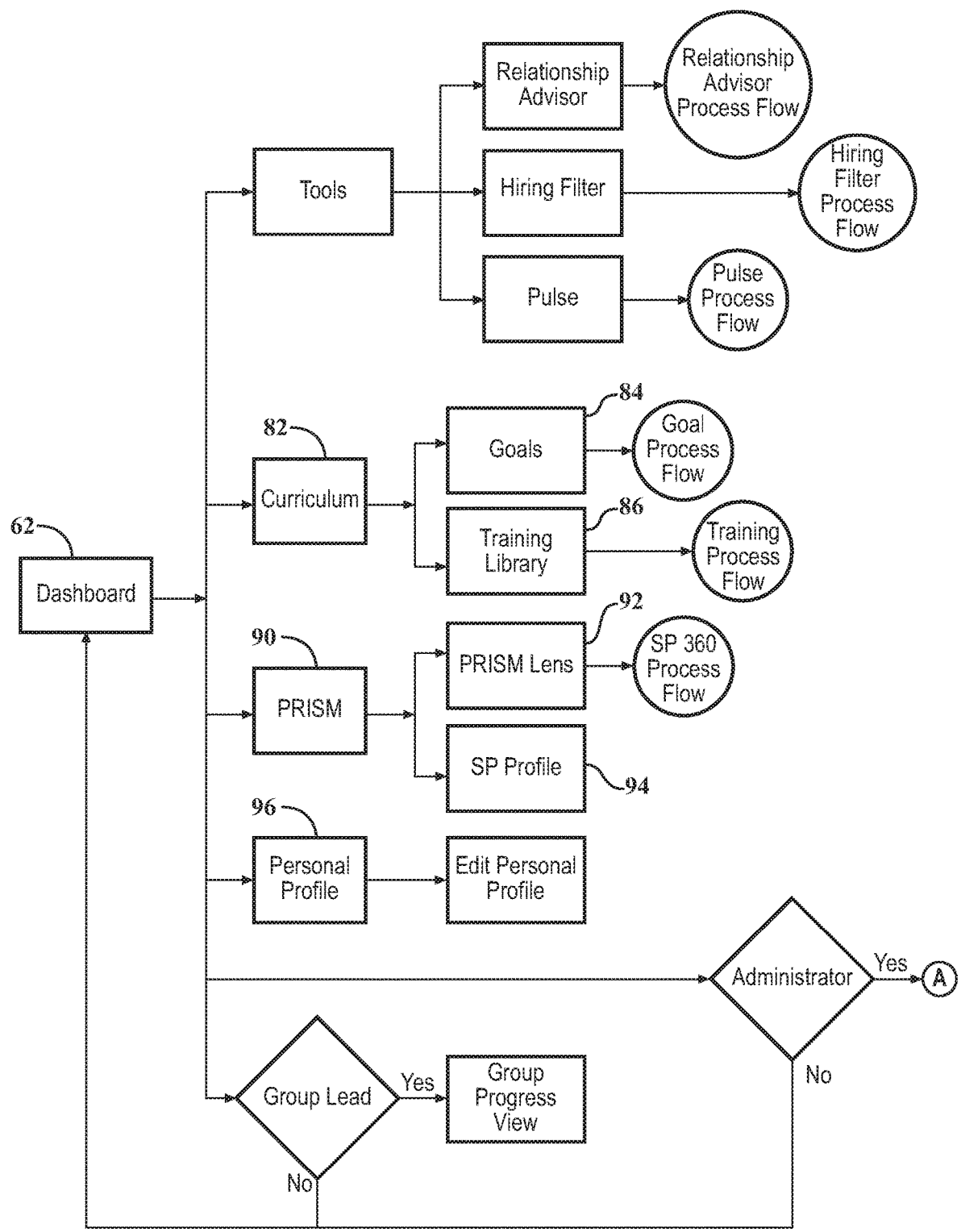
FIGS. 3A and 3B show a flow diagram of the business dashboard.
Figure 3B:
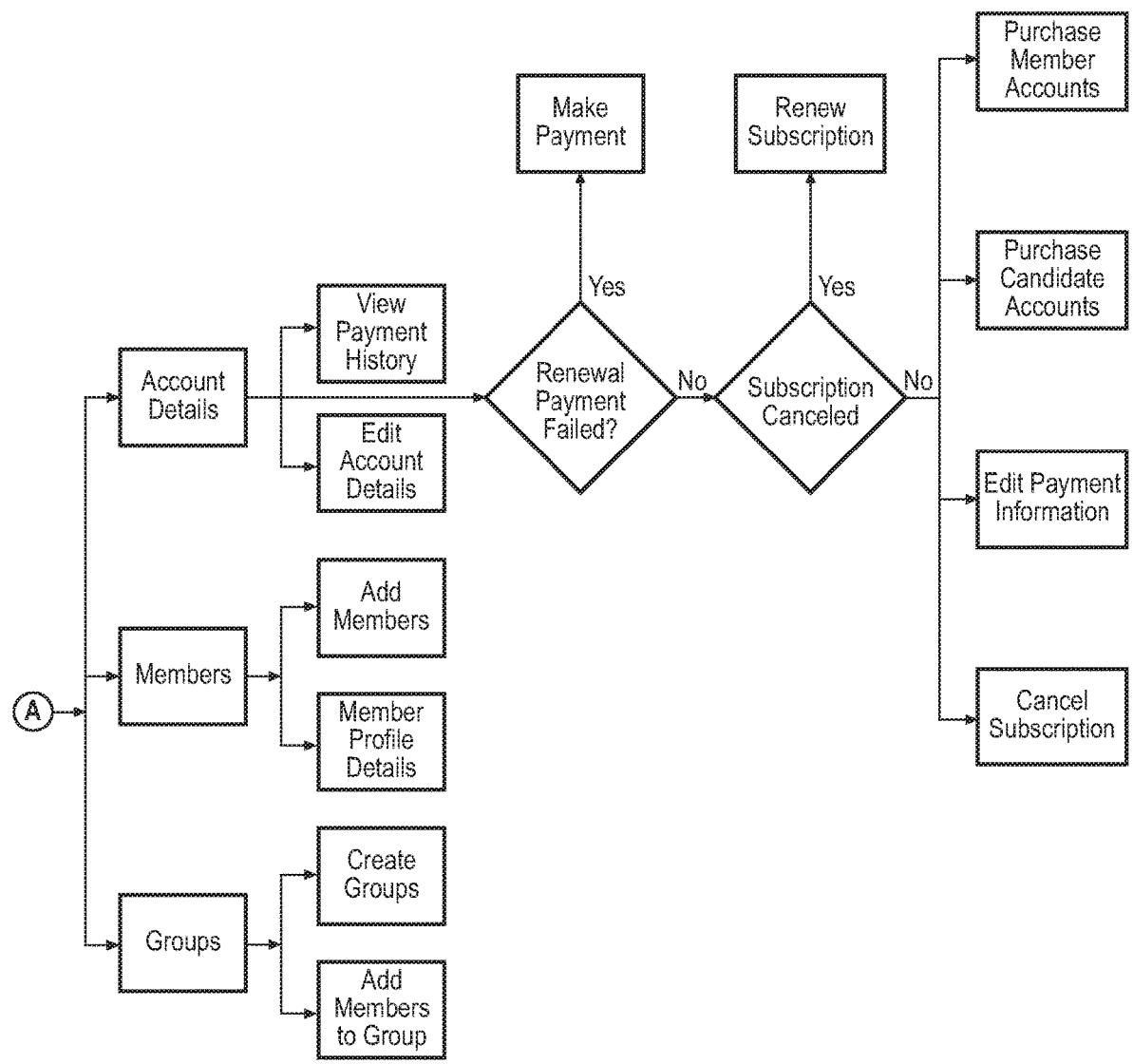

The dashboard 62, shown in FIGS. 3A and 3B, also allows access to various assessment or module features, such as a knowledge center 86. The dashboard 62 allows selection of a PRISM LENS™ module 92 allowing access to assessments 92 by an individual's peers and/or manager, or other individuals (see FIGS. 4A and 4B), as well as to employee profiles 94. The dashboard 62 also allows access to a personal profile module 96 allowing the business administrator to edit the personal profile of any employee.

The dashboard 62 also provides additional versatility for the business to make payments as well as for the individual selected by the business or an outside individual to take an assessment 90. As shown in FIGS. 3A and 3B, a business administrator may assess account details 87 and make payments 89 in a number of different ways, such as all at once, periodic, automatically renewable, etc.

The business administrator may also authorize an individual selected by the business administrator to take an assessment test 90 to select, either at the businesses' or the individual's preference, to take all seven assessments of the PRISM™ assessment test 90 at one time, one at a time, in any partial sequence of less than the seven assessment, as well as providing a date deadline for completing all of the of the PRISM™ 90 assessment. In some instances, a business may not require all seven module of the PRISM™ 90 assessment described hereafter, in which case the business may direct an individual to take only selected assessments which are than presented to the individual. In the latter case, the individual may still have the preference to take all or some of the selected assessments at over a one-time preset time period etc.

Figure 4A:
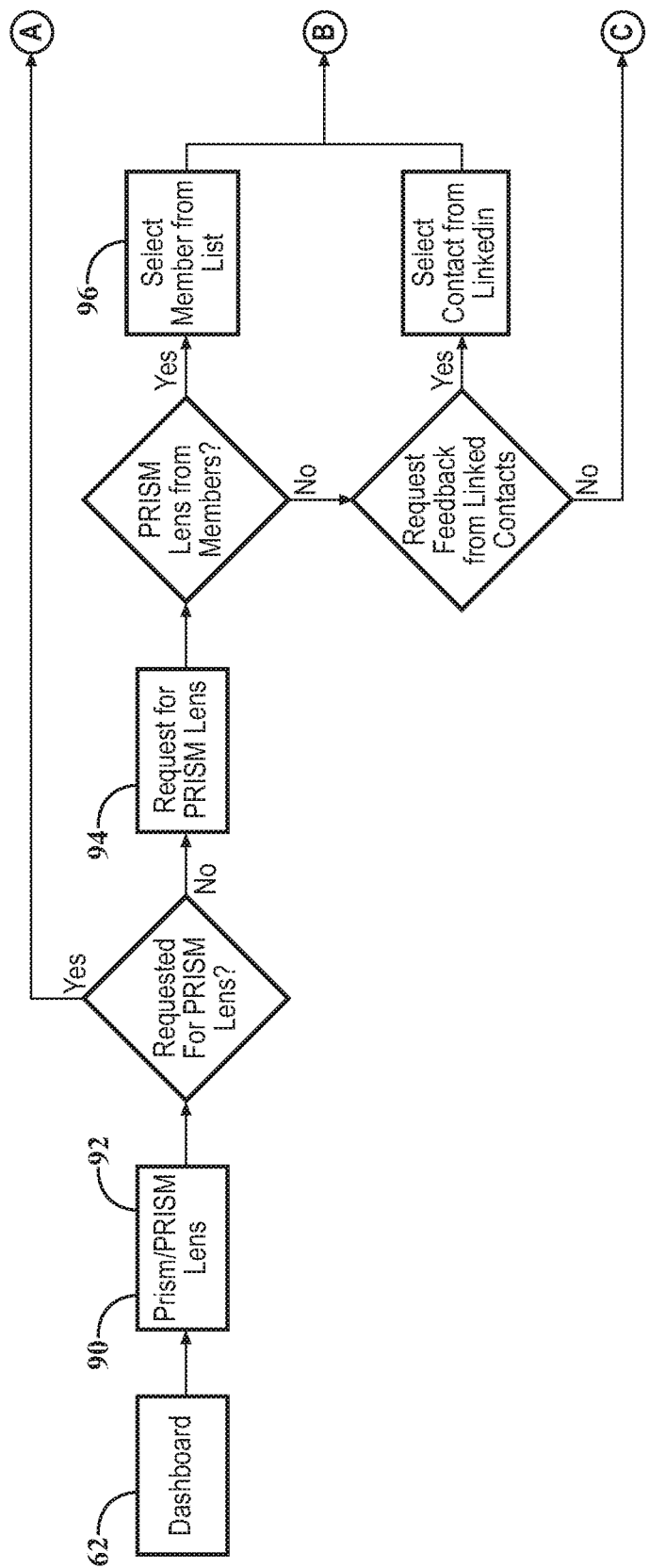
FIGS. 4A and 4B show a flow diagram of a business request for PRISM LENS™ assessment.
Figure 4B:
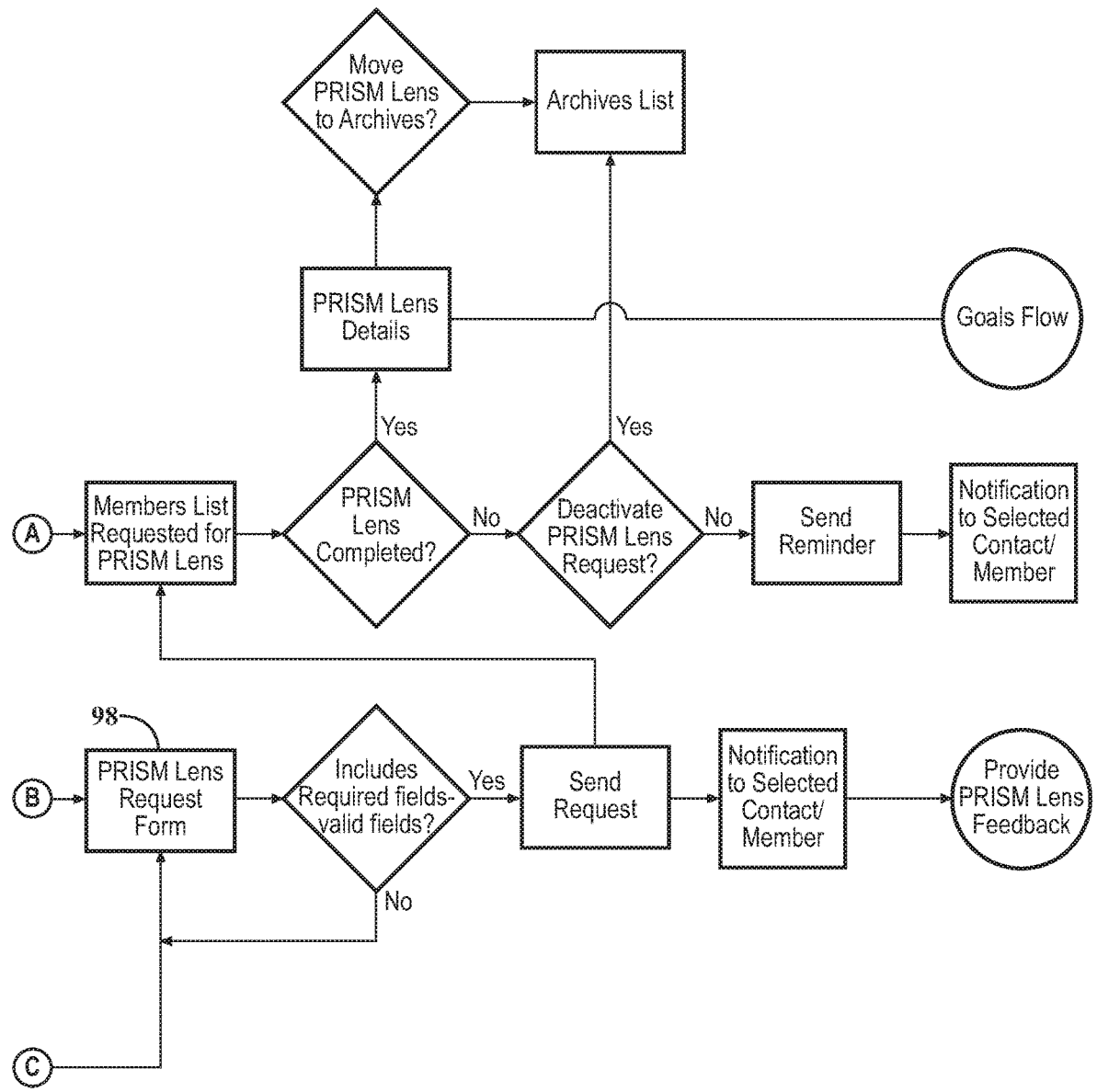
Figure 7A:
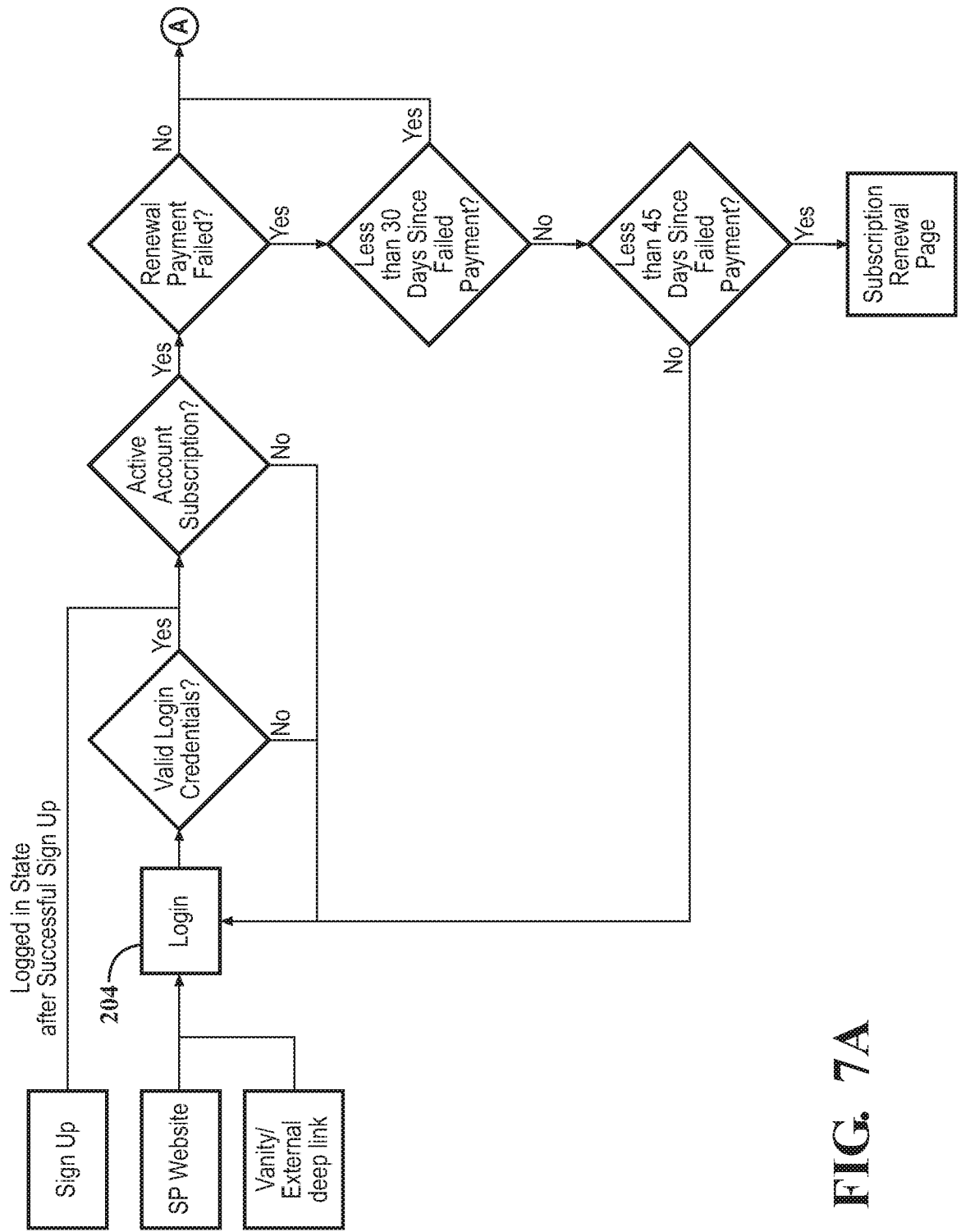
FIGS. 7A and 7B show a flow diagram of the individual login sequence.
Figure 7B:
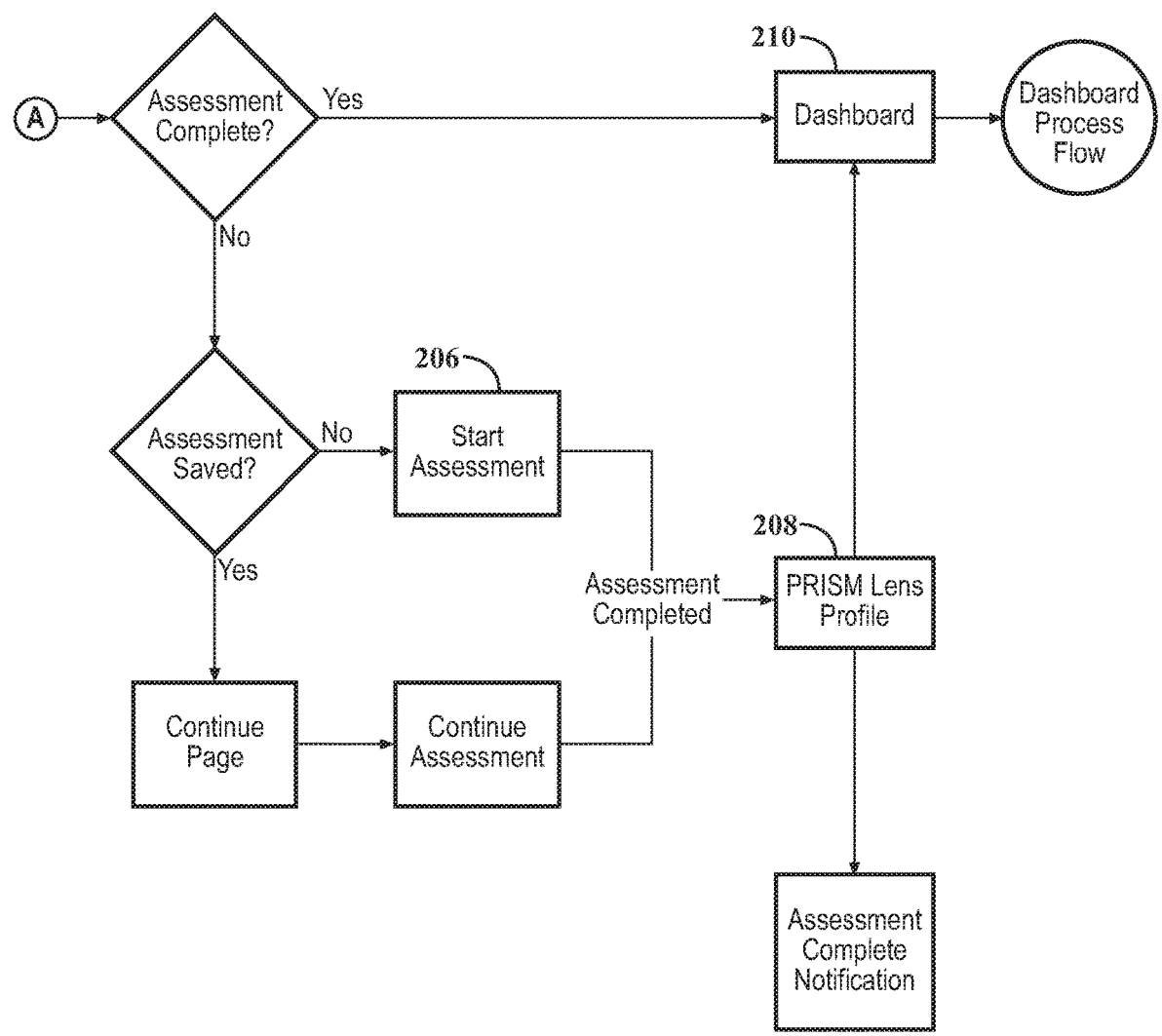
Figure 8A:
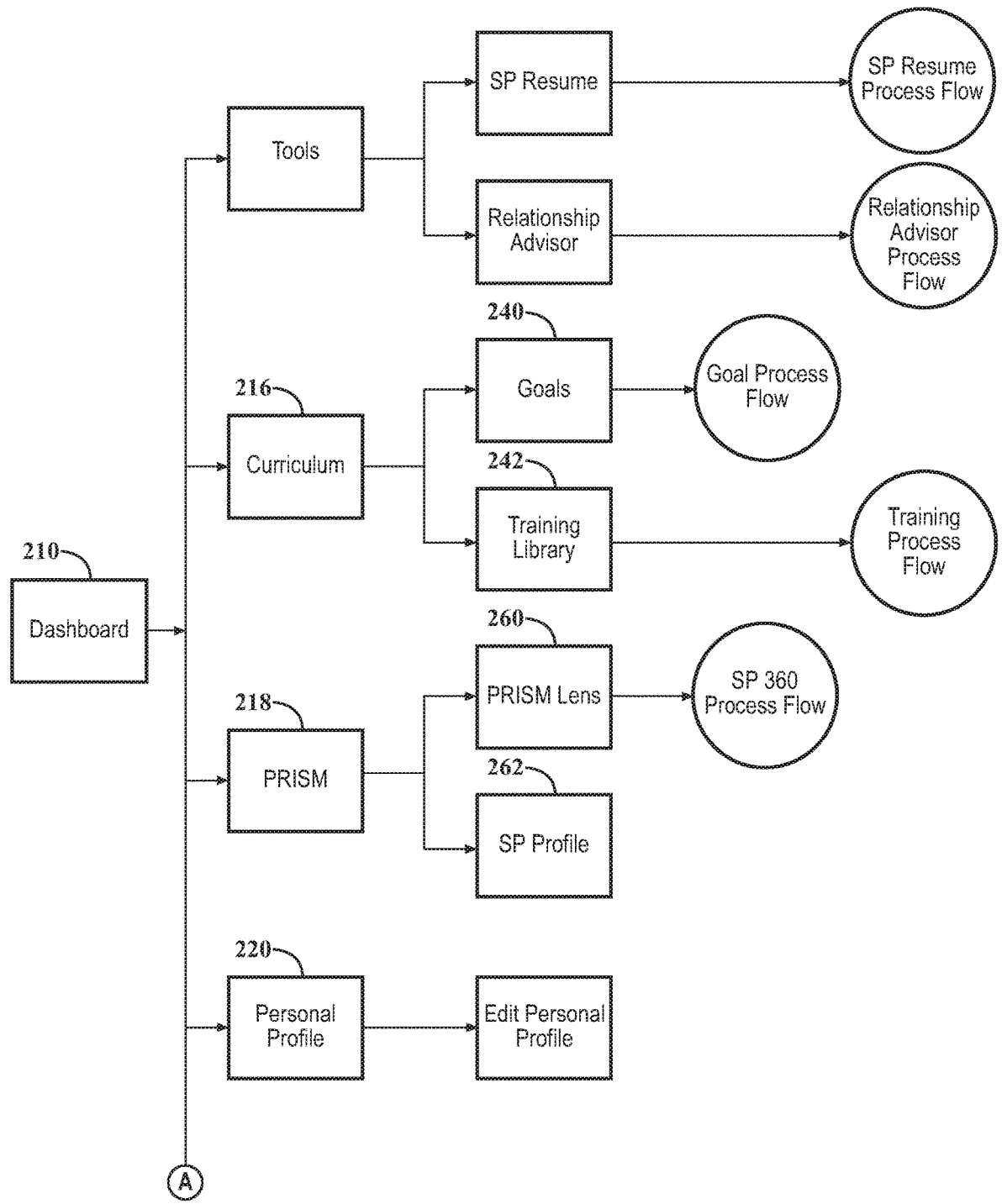
FIGS. 8A and 8B show a flow diagram of the individual dashboard of the present apparatus and method.
Figure 8B:
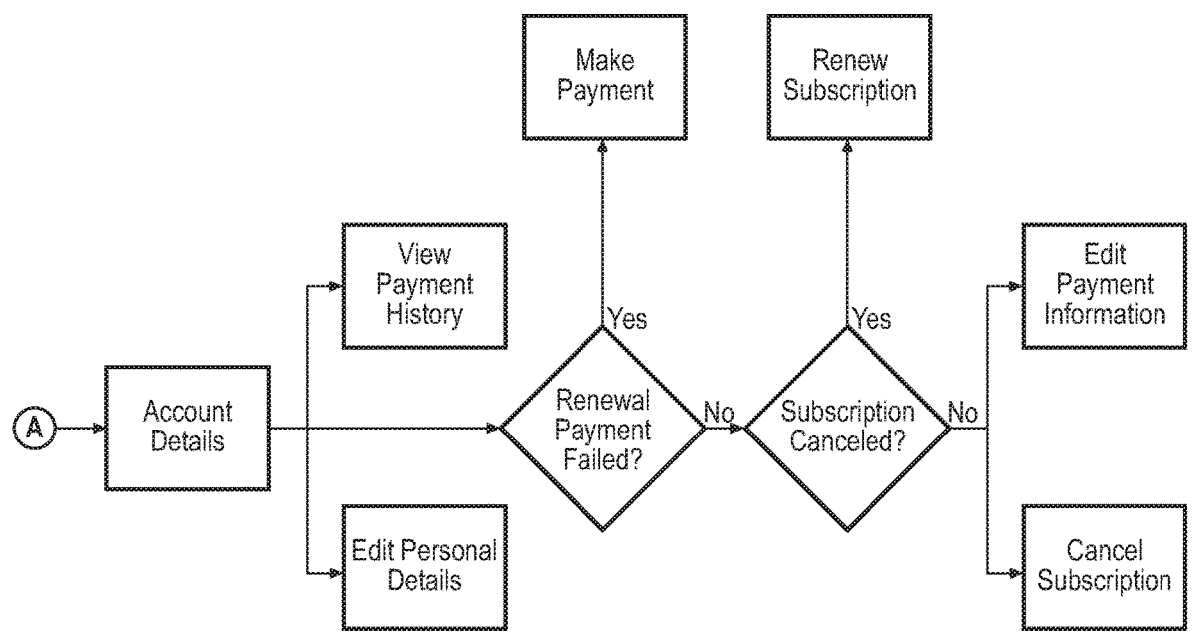

In the business mode, shown in FIGS. 4A, 4B, and 5, an administrator and/or employee may submit a request for an individual, such as an employee or non-employee, to take a PRISM LENS™ assessment 92 on another individual.

An individual may access the apparatus and method as described hereafter and shown in FIGS. 6-11I. Such individuals may be employees of a particular business who is registered with the apparatus and method, as described above, or totally unrelated to a particular business. An individual, as shown in FIG. 6, can individually register in step 200 or register through a business in step 202. After logging in in step 204 in FIG. 7A, an individual can start and/or continue the assessment 206 to create a 360 degree profile 208 (see FIG. 7B), which is input to a dashboard 210 for each individual. The dashboard 210, as shown in FIGS. 8A and 8B, allows access to a tools module 212, and a prism module 218.

Figure 9A:
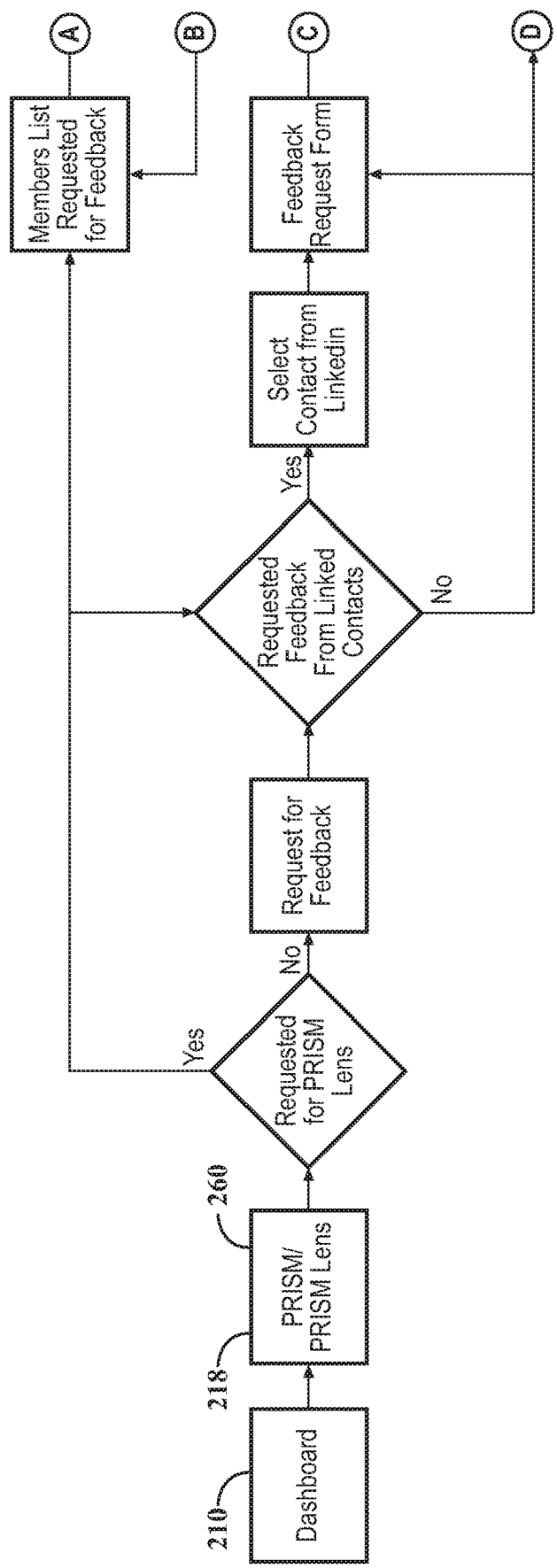
FIGS. 9A and 9B show a flow diagram of an individual request for a PRISM LENS™ assessment.
Figure 9B:
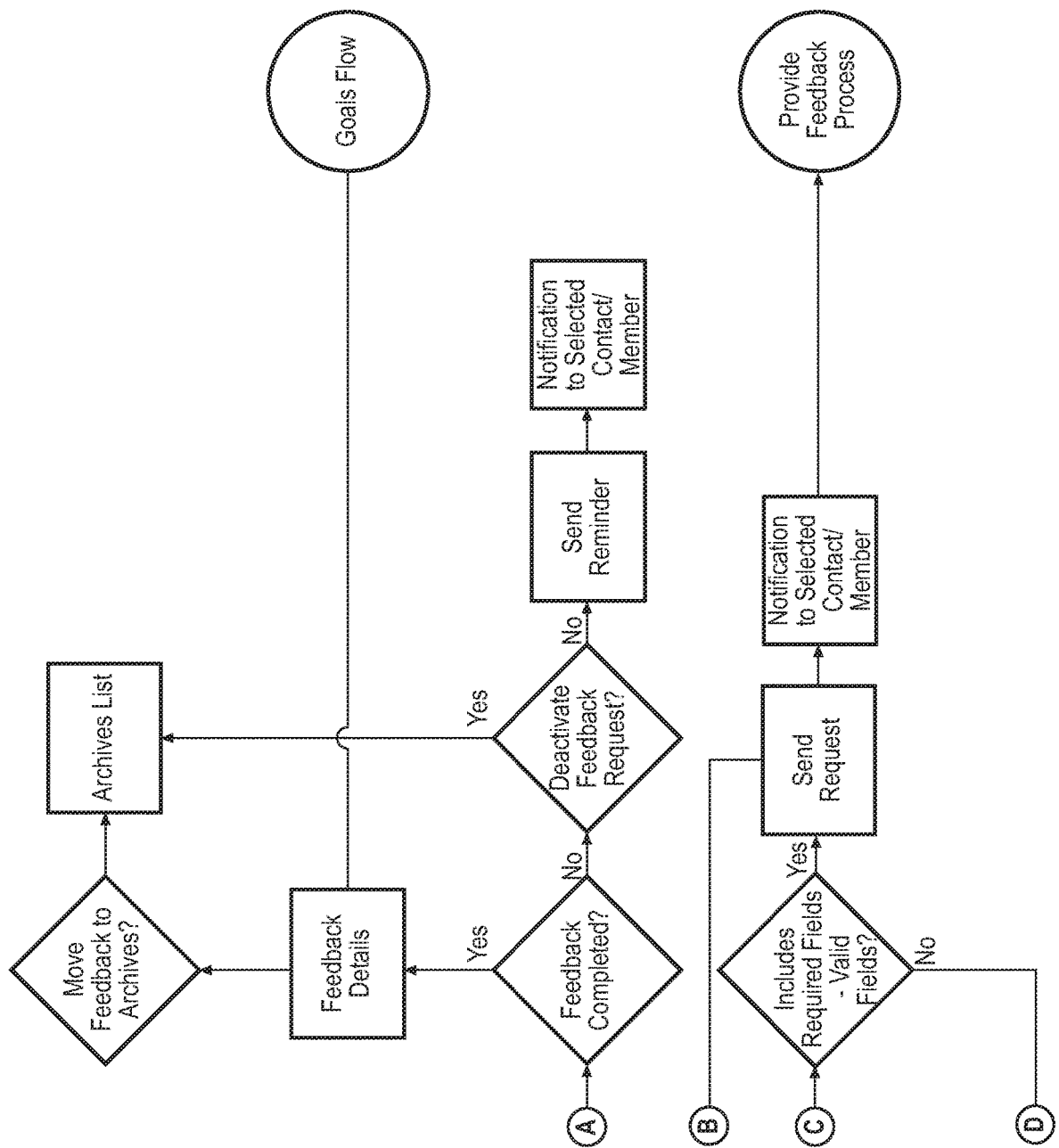

As shown in FIGS. 9A and 9B, an individual, through the PRISM LENS™ module 218, can access the PRISM LENS™ assessment 260 or review the individual's profile 262. As shown in detail in FIGS. 5, 8A, 8B, 9A, and 9B, when the individual selects the PRISM LENS™ assessment 260, the individual can select contacts or members for assessment by the sequence shown in FIGS. 14A-C and receive feedback and actionable recommendations to improvements of the employee(s).

Figure 10:
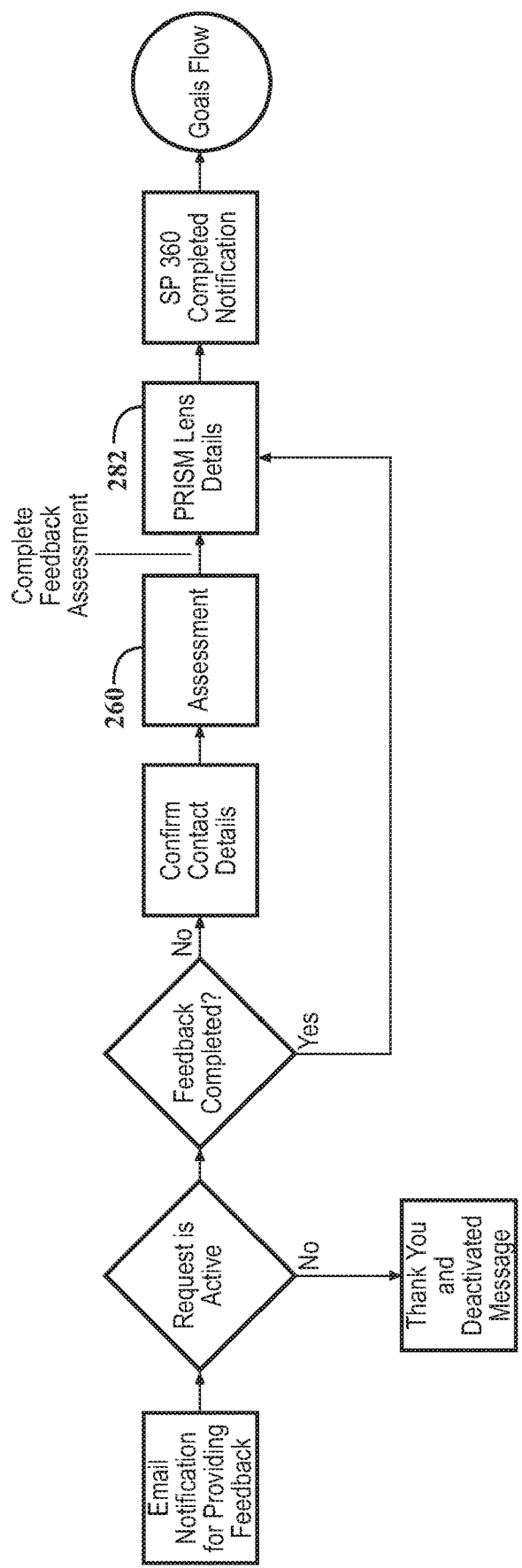
FIG. 10 is a flow diagram of the sequence for an individual to take a PRISM LENS™ assessment.

Finally, as shown in FIG. 10, an individual can access and complete the assessment 260 and receive an assessment report 282.

The PRISM LENS™ module 92 is further shown in detail in FIGS. 4A and 4B, when the PRISM™ module 90 and the PRISM LENS™ assessment tool module 92 are accessed through the dashboard 62. The PRISM LENS™ assessment module 92 allows a business administrator to select one or more individuals or employees of the business to provide an assessment of one employee. After receiving a request for the PRISM LENS™ assessment 92 in step 94, the business administrator can select one or more members from a list 96 and then send a request form 98 to the selected members.

The PRISM™ 90 assessment takes large amounts of data and converts the data to make it easy for businesses and employees to see, understand and put into action. The PRISM™ 90 assessment functions to identify multiple attributes including personality profile (primary and under pressure), processing blueprint, motivation, conflict management, fundamental needs, decision making and learning style.

The assessment apparatus and method creates a number of distinct primary employee personality profiles and employee personality profiles under pressure to assist a business administrator in determining whether or not to hire an employee, as well as determine how the employee is interacting with other business or business team members and the fit between employees on a team. Such personality profiles can include, for example:

Scientist Researcher
Navigator
Visionary
Architect
Catalyst
Tough & Tender
Connector
Instructor
Ally
Pragmatist
Strategist
Influencer
Peacemaker
Pioneer
Ambassador The apparatus and method establishes characteristics for each of the personality profiles describing how an employee having a particular personality thinks, makes decisions, handles tasks and other personal relationships, work environment preferences. Each personality also has a list of work style characteristics, as well as how this particular individual with a specific personality may fit into a particular business team, how the individual is likely to communicate with team members, how the individual is influenced by negative perceptions of or by other team members. Such characteristics also enable a supervisor to best supervise and encourage an individual with a particular personality profiles.

These personality profiles enable a business administrator, when forming a team of employees or hiring a new employee as an addition to an existing team, to best choose the team members or the new employee to fit into the team, and to meet the goals of the team.

These personality types and personality under pressure types are established by the assessment program which asks an individual a series of questions describing workplace scenarios, preferences, motivation, work styles, etc. Based on the answers, the assessment program of the apparatus and method establishes a particular personality type for an individual. The established characteristics associated with that individual's personality can then be established for the business administrator.

This assessment information is valuable to the business administrator when forming a team, determining the efficiency of an established team, or when conferring to hire a new employee and placing that employee in a particular team. This enables the business administrator to achieve the business goals in an efficient manner, as well as advancing the growth of each employee.

A business employee, as well as non-business individuals, who take the PRISM™ 90 assessment, are provided with a custom portrait of their personality, how they operate in a business environment when making decisions, interacting with others, achieving goals, for advancing the individual to meet business-related and/or life goals.

Appendix A depicts a number of different personality profiles used by the present assessment apparatus and method. These personality profiles are examples only as the number of personality profiles used by the apparatus and method can include less than or more than the different personality profiles described in Appendix A.

The personality profiles shown in Appendix A as well as the actual assessment as described hereafter are provided by way of an example as any available assessment program may be employed in the present apparatus and method. The personality characteristics of any individual from any available assessment can be correlated to the sixteen personality profiles and the seven assessments described hereafter.

FIGS. 11A-11I depict different forms of assessment questions presented to the individual as part of the PRISM™ 90 assessment. The questions are displayed on a monitor and generally ask an individual to choose the characterization that most generally describes that individual's view of the assessment question. The page displayed on the monitor also enables the individual to easily return to a previous question or to advance to the next question. The display also depicts the percent completion 310 of the entire assessment 90.

The data driven assessment apparatus and method presents the personality and the individual characteristics in easy to read scales, charts and graphs to enable a business administrator or the individual to easily ascertain the individual's personality, decision making tendencies motivation, etc.

The PRISM™ 90 assessment reveals both primary personality FIGS. 12A-12D and personality under pressure FIGS. 13A-13D within a four dimensional scale that measures power, versatility, precision and adaptability. The PRISM™ 90 assessment delivers a comprehensive summary filled with insights and a unique classification for people to see, read, and understand their personality.

Not everyone absorbs information in the same way. After processing information, some people will make decisions more with their head, while others tend to take action with their heart. The temperament feature of PRISM™ 90 assessment shown in FIGS. 14A-14C shows how employees approach people, activities, thoughts, and causes in their lives based on four distinct scales, including:

Internal vs External: How people are energized by outside factors or inner thoughts and concepts.

Intuitive vs Concrete: The way people take in and perceive information.

Head vs Heart: If people tend to make decisions guided more by their thoughts or feelings.

Spontaneous vs Orderly: How people prefer to approach and relate to live.

Motivation is also a determination of the PRISM™ 90 assessment, as shown in FIGS. 15A-15C. Some employees may want recognition while others need a little encouragement to keep moving forward. The motivation output of the PRISM™ 90 assessment uncovers how people are motivated, why they are motivated, and what they are motivated by.

How employees deal with workplace conflicts is important since such conflicts arise all the time. The conflict management output of the PRISM™ 90 assessment, as shown in FIGS. 16A and 16B reveals how a business's employee's or prospective employees work through issues with others, by competing, calibrating, avoiding, accommodating or compromising. Such insights allow business administrators greater understanding on how the business's employees interact with one another and deal with conflict, thereby allowing the business administrator to foster more productive working relationship.

All employees have fundamental needs that drive the employees and contribute to their outlook, attitude, motivation, and behavior. The fundamental needs output of the PRISM™ 90 assessment, as shown in FIG. 17, measures a person's desire to maintain control, have security or achieve significance. These insights provide a business administrator with a deeper understanding about their employee's needs for helping team members to appreciate and communicate with each other.

Every employee has their own unique style and internal or external rationale for making decisions. The decision making output of the PRISM™ 90 assessment, as shown in FIGS. 18A and 18B, measures this critical component of an individual based on four unique yet related decider scales, including outward, inward, careful and rapid.

Understanding how people learn can assist a business and employees to communicate more effectively with one another in a team environment in another factor. The learning style output of the PRISM™ 90 assessment, shown in FIGS. 19A and 19B, reveals how people process information and details with two distinct scales of learning—global and analytical. A global leader tends to focus on the big picture and might take more risks than others. An analytical leader pays close attention to the details and strives for accuracy.

FIGS. 20A-20C depict all of the charts and graphs shown in FIGS. 12A-19B in a one-page summary for ease of use by a business administrator as well as the individual to determine the individual's personality characteristics.

Referring now to FIGS. 21A-26B and Appendix B, there is depicted an individual learning and development apparatus and method or program 300 suited for advancing the learning and skills of an individual to meet business-related goals of an organization. The apparatus can employ the computer and cloud base communication system shown in FIG. 1 with the addition of the additional operating programs related to the intelligent learning and development program 300. Alternatively, the learning and development operating program(s) can be installed on a completely different set of servers or computers. The assessment data, described above, can be input into a separate set of servers or computer for use in the learning and development program 300.

Referring now to FIGS. 21A and 21B, there is depicted a sequence of flow diagram depicting the operation of the learning and development program 300 and a block diagram of the major elements of the learning and development program 300.

The first step in implementing the learning and development program 300 is to access the individual's assessment(s) in step 400. The assessments, as described above, can include the individual's personal assessment(s) from a PRISM™ assessment program 302, a PRISM LENS™ assessment program 304, using third parties to rate the individual in various categories, as well as assessment ratings 306 from an individual's peers or managers as seen in FIG. 22. The assessments 302, 304 and 306 can be individually selected for use in the intelligent learning method, combined together into one large assessment data pool, or multiple PRISM™ Lens assessments 304 and/or multiple rating(s) 306 may be employed by themselves and averaged and/or used in combination with the PRISM™ assessment 302. The assessments 302, 304 and 306 define an individual's personality and the dimensions of the personality relative to emotional, relational and team intelligence. The personality dimensions can apply to life in general, marriage, sports, business and other aspects of an individual's life, even though business personality traits will be described hereafter as an example.

As previously described, a number of different dimensions of personality, such as power, versatility, motivation, fundamental needs, conflict management under pressure etc., are determined using the assessment programs 302, 304 and 306.

The results from the assessment sources 302, 304 and 306 are used as input to an algorithm which acts on the individual's assessments for a number of personality traits or characteristics, such as outlook, attitude, motivation, behavior, decision making, etc., as described above, in conjunction with the individual's personality type, as also described above.

A rating, such as a percent of 1 to 100, is determined for each attribute of the individual for the particular personality type determined for the individual. For each assessment measured category, various business related characteristics of an individual or an employee, such as outlook, attitude, motivation, behavior, decision making, etc., are analyzed to determine the individual's ranking, using business standards or thresholds, to determine how the individual measures with respect to the business's or individual's goals and desired business characteristics. The algorithm, accessing a practice area repository 402, such as an assessable memory containing the practice areas defined hereafter and shown in Appendix B, determines a ranking of the practice areas 310 in step 404. The algorithm ranks the practice areas 310 most suited to provide learning opportunities for the individual when the individual's performance characteristics are measured against business standards, business goals, peer standards, etc.

A list of the potential practice areas 310 is shown by example in Appendix B. Fewer or more practice areas 310 may be added as required for the needs of a particular individual. The practice areas 310 are then presented to the individual by a display screen on a computer, mobile device, a print out, by audible voice, etc., in step 406. The practice areas 310 can be ranked in the order of those practice areas 310 requiring the greatest amount of learning by the individual to those which require a lesser amount of learning, such as those practice areas 310 in which the individual's characteristics closely approximate those of a business industry standards, a particular business's goals, etc.

Some of the practice areas 310 may be weighted higher in terms of importance so as to appear higher in the list of practice areas 310 determined by the algorithm. In addition, some personality trait strengths of an individual which would normally appear lower on the list of practice areas 310 may be elevated to a higher position of importance on the list of practice areas 310 to maintain the high skill level of the individual in that particular trait, personality or attribute.

For example, a preselected number of the top ranked practice areas 310 are presented in a list from the greatest required amount of learning to lesser amounts of learning for a particular individual at one time. As shown in FIG. 23A, for example, six practice areas 310, such as seeking feedback, managing emotions, giving & receiving feedback, personal fulfillment, drive action, and delegation, are presented to the individual.

For convenience only, only a preselected number of the top rated practice areas 310 are presented to particular individual at one time. The individual, as shown in FIG. 23A in the area 340, can customize 335 his or her development plan in step 408 by adding or removing any of the listed practice areas. As shown in FIGS. 24A-24C, the individual is presented with a list to rearrange or update the practice areas in heading 342 or to cancel a particular practice area 310 by clicking on heading 344. If one or more practice areas 310 are cancelled, the next highest ranked practice area 310 from the algorithm output are then presented to the individual in a list in step 410.

Any new practice area 310 selected by the individual can be added to the list, such as for example at the bottom of the list of display practice areas 310. The learning program allows the individual to optionally drag any of the practice areas up or down to shuffle or rearrange the list order of the practice areas 310.

For each practice area 310, etc., one or a plurality of pre-defined development strategies 330 are presented to the individual as shown in FIG. 23A. Clicking on or otherwise selecting any one of the listed development strategies 330 accesses strategies, one of which is shown for example in FIG. 26B, formed of articles, notes, textbooks, etc., relating to a specific practice area 310 which provide learning information about the practice area 310 to enhance and/or maintain the individual's skill in the selected practice area 310.

The individual has the ability, via the apparatus and method program 300, to fully research, study and review all of the articles and other material provided for a particular development strategy 330, such as development strategy 332, before moving on to the next listed development strategy 334. Alternately, the individual can bypass one or more of the listed development strategies 330 and move on to any of the listed development strategies 330.

In the customizing step 408, the individual can alternately select any of the practice areas 310 presented to him or her. With each selected practice area 310, the individual can then review and select one, a plurality, or all of the presented development strategies 330 for the selected practice area 310. In this manner, the individual creates an action plan 380, as partially shown in step 416 in FIG. 21A, for enhancing the individual's skills and traits.

Referring back to FIGS. 23A to 23E, in each development strategy 330, the individual has a number of options, such as posting a note by clicking on header 360 or requesting feedback by clicking on header 362. These inputs are included under the accountability header 354 in FIG. 21B. Posting a note allows the individual to bookmark a particular article, strategy or other output from the knowledge center 352 for later review.

A knowledge center 352, stored in a memory, can be accessed via the internet, for example, to provide detailed learning and development for the individual by providing access to expert treatises, ideas, article, etc., for improving an individual's skills in selected practice areas. The knowledge center 352 is shown in FIG. 25.

In addition to selectively visiting the knowledge center 352, the individual can also assess a knowledge building portion 337 of the practice area and development strategy portion of the intelligent learning and development apparatus.

The knowledge building portion 337 has an individual selectable filter 338 allowing the individual to select from various development media provided by editor's choice, favorites and the bookmarks previously entered by the individual. The filter 338 also provides a "completed" entry. Examples of the various media 339 are shown in FIGS. 23A-23E for each practice area 310 and development strategy 330.

Header 380 (see FIG. 21B) and step 416 in FIG. 21A depict a selected individual learning plan 380. The individual learning plan 380 includes the ranked practice areas 310 selected by the individual, the development strategies 310 associated with each practice area 310 and selected by the individual, as well as access to the knowledge center 352 for data, articles or other reference materials along with the learning pace selected by the individual via the learning scheduler in step 412, to assist the individual in advancing and/or maintaining his/her skills.

The apparatus and method 300 also feature an auto learning scheduler 370, and also shown in step 412 in FIG. 21A. The auto learning scheduler 370 allows an individual to customize 372 in FIG. 21B, the frequency of the learning process in step 414 by selecting either a fast learning process in step 374 or a somewhat slower flow learning process step in 376. In the fast learning process step 374, one practice area 310 is presented to the individual in each two-week segment, with one development strategy 300 presented every two weeks in a micro-cycle duration or every four weeks in a macro-cycle duration fast learning process. The flow auto learning process 376 is slower in that the flow auto learning process presents each development strategy segment for one month at a time. A micro-cycle duration of six months or one practice area 310 each month, or a macro-cycle duration of one practice area 310 every twelve months may also be individually selected.

Individual can also proceed though the individual action plan 380 at a self-pace as shown by step 418 in FIG. 21A. In the self-pace process 418, the individual proceeds at his or her own pace through the practice areas 310 and associated development strategies 330. Upon completing each selected development strategy 330 for a particular practice area 310, the next development strategy 330 is then presented to the individual. Once all of the selected development strategies 330 for particular practice area are completed, at the individual's selection, the next practice area 310 on the ranked list of practice area 310 on the list in the individual learning plan 416 selected by the individual is then presented along with the associated development strategies 330 selected by the individual as part his or her learning plan 416 for that selected practice area 310.

FIG. 26A depicts a periodic reminder, such as a daily reminder sent to the individual, providing access to related subjects in the knowledge center 352 relating to the particular practice area 310 being reviewed by the individual.

For example, the brief segment shown in the email depicted by example in FIG. 26A, may be expanded, if clicked on by the individual, into the complete article as partially shown in FIG. 26B.

What is claimed is:

1. A method for individual learning and development to improve at least one personality trait of an individual, the method comprising:

accessing at least one assessment of the individual relating to the at least one personality trait of the individual and personal characteristics and performance of the individual in the at least one personality trait;

preparing a list of skill practice areas for the individual relating to the personal characteristics and performance of the individual in the at least one personality trait;

providing, for each practice area, at least one development strategy for enhancing and/or maintaining the skills of the individual in each practice area; and presenting at least one practice area with the at least one development strategy associated with the at least one practice area to the individual;

wherein the at least one assessment comprises the following items: a primary personality of the individual; a personality of the individual under pressure; a processing style of information by the individual; a motivation of the individual; a conflict management of the individual; a fundamental need of the individual; and a decision-making style of the individual;

wherein the accessing the at least one assessment is done by an employer to determine whether or not to hire the individual or to determine how the individual is interacting with other team members.

2. The method of claim 1, further comprising:
presenting the list of practice areas to the individual by ranking the practice areas from the practice areas requiring the most learning of the individual to the practice areas requiring a lesser amount of learning.

3. The method of claim 2, further comprising:
allowing customizing of the ranking of listed practice area by the individual.

4. The method of claim 1, further comprising:
providing a learning schedule for the individual for at least one of each practice area and at least one development strategy.

5. The method of claim 4, further comprising:
providing at least two individually selectable learning schedules, each learning schedule presenting one of a new practice area or a new development strategy to the individual at different time intervals.

6. The method of claim 5, wherein
the at least two learning schedules includes providing one of a selectable self-pace learning schedule by the individual and an automatic learning schedule presenting the at least one of a practice area and the at least one development strategy to the individual on a periodic time basis.

7. The method of claim 1, further comprising:
allowing access to a knowledge center containing selectable media to enhance and/or maintain the individual's skill in at least one of the practice area and the development strategy in the practice area.

8. The method of claim 1, further comprising:
allowing the individual to add and remove practice areas from the list of practice areas.

9. The method of claim 8, further comprising:
displaying a plurality of practice areas for selection by the individual.

10. The method of claim 8, further comprising:
allowing the individual to reorder the practice areas in the list of practice areas displayed to the individual.

11. The method of claim 1, further comprising:
providing a periodic reminder to the individual related to a development strategy provided to the individual.

12. The method of claim 11, further comprising:
presenting a skill related media to the individual related to the development strategy with the period reminder.

13. The method of claim 1, wherein the individual is an employee and the accessing the at least one assessment is done by the employee's peer, manager, or employer to assess the employee.

14. The method of claim 13, further comprising the employee's peer, manager, or another individual providing the at least one assessment.

15. The method of claim 1, further comprising comparing the at least one assessment of the individual to a number of distinct personality profiles in order to determine a particular personality type for the individual.

16. The method of claim 1, wherein the at least one assessment measures power, versatility, precision, and adaptability.

17. The method of claim 1, wherein the at least one assessment determines how the individual approaches people, activities, thoughts, and causes using a plurality of scales.

18. The method of claim 1, wherein the at least one assessment determines how the individual is motivated, why the individual is motivated, and what the individual is motivated by.

19. The method of claim 1, wherein the at least one assessment determines how the individual works through issues with others by competing, calibrating, avoiding, accommodating, or compromising.

20. The method of claim 1, wherein the at least one assessment measures the individual's desire to maintain control, have security, or achieve significance.

21. The method of claim 1, wherein the at least one assessment measures this based on decider scales including outward, inward, careful, and rapid.

22. The method of claim 1, wherein the at least one assessment determines this using global and analytical scales.

23. The method of claim 1, wherein the at least one assessment is used to define the individual's personality relative to emotional, relative, and team intelligence.

24. The method of claim 1, further comprising for each assessment of the individual determining a ranking of the individual to determine how the individual measures with respect to at least one goal of the individual or at least one goal of a business.

25. The method of claim 1, further comprising the individual alternatively selecting the practice area presented to the individual, and the individual selecting for each alternatively selected practice area the development strategy the individual wishes to implement for the selected practice area.

26. The method of claim 2, further comprising the individual proceeding through all of the development strategies for the practice area requiring the most learning, and then proceeding in ranked order to each practice area and completing all of the development strategies for each practice area prior to proceeding to the next ranked order practice area until all practice areas are completed.

27. The method of claim 1 further comprising displaying the individual's personality and the individual's personal characteristics with scales, charts, and graphs.

28. An apparatus for individual learning and development to improve at least one personality trait of an individual, comprising:
a computer processor with a memory, the computer processor accessing a source of personality trait assessment data of at least one individual;

an accessible store containing a plurality of practice areas to develop skills of the individual, each practice area having at least one development strategy to enhance and/or maintain the individual's skill in a related practice area;

the computer processor executing program instructions to:

access at least one assessment of the individual relating to the at least one personality trait of the individual;

prepare a list of skill practice areas for the individual relating to the at least one personality trait assessment;

provide, for each practice area, at least one development strategy directed to the skills of the individual in the practice area; and present at least one practice area with the at least one development strategy associated with the at least one practice area to the individual; and an interactive processor and display for presenting the practice areas and the development strategies to the individual;

wherein the at least one assessment comprises the following items: a primary personality of the individual; a personality of the individual under pressure; a processing style of information by the individual; a motivation of the individual; a conflict management of the individual; a fundamental need of the individual; and a decision-making style of the individual;

wherein the access the at least one assessment determines whether or not an employer should hire the individual or how the individual is interacting with other team members.

29. The apparatus of claim 28, further comprising:
a knowledge based media store of selectable skill related media.

30. The apparatus of claim 28, further comprising:
the computer processor executing control program instructions to create a learning schedule for the individual for at least one of each practice area and development strategy.

\* \* \* \* \*